United States Patent
Bromberg et al.

(10) Patent No.: US 10,619,580 B2
(45) Date of Patent: Apr. 14, 2020

(54) OPTIMIZED FUEL MANAGEMENT SYSTEM FOR DIRECT INJECTION ETHANOL ENHANCEMENT OF GASOLINE ENGINES

(71) Applicant: Massachusetts Institute of Technology, Cambridge, MA (US)

(72) Inventors: Leslie Bromberg, Sharon, MA (US); Daniel R. Cohn, Cambridge, MA (US); John B. Heywood, Newtonville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/662,429

(22) Filed: Oct. 24, 2019

(65) Prior Publication Data

US 2020/0056557 A1  Feb. 20, 2020

Related U.S. Application Data

(63) Continuation of application No. 16/251,658, filed on Jan. 18, 2019, now Pat. No. 10,557,423, which is a
(Continued)

(51) Int. Cl.
    *F02D 41/10* (2006.01)
    *F02D 41/00* (2006.01)
    (Continued)

(52) U.S. Cl.
    CPC ........ *F02D 41/0025* (2013.01); *F02B 17/005* (2013.01); *F02B 47/04* (2013.01);
    (Continued)

(58) Field of Classification Search
    CPC ......... F02D 41/3094; F02D 2200/1002; F02D 41/1454; F02D 41/401; F02D 41/0025; F02D 19/08; F02D 41/1475
    See application file for complete search history.

(56) References Cited

U.S. PATENT DOCUMENTS 2,741,230 A  4/1956  Reynolds
3,089,470 A  5/1963  Payne
(Continued)

FOREIGN PATENT DOCUMENTS

DE  19853799 A1  5/2000
JP  S63230920 A  9/1988
(Continued)

OTHER PUBLICATIONS

"The Ford Motor Co.'s Initial Invalidity Contentions" from *Ethanol Boosting Systems LLC and Massachusetts Institute of Technology v. The Ford Motor Company*, in the United States District Court for the District of Delaware, Civil Action No. 19-cv-196-CFC, and associated Exhibits A, B, C, D, E, F, G, J, K, L, M, and N, Aug. 30, 2019. (374 pages).
(Continued)

*Primary Examiner* — Long T Tran

(74) *Attorney, Agent, or Firm* — Nutter McClennen & Fish LLP

(57) ABSTRACT

Fuel management system for enhanced operation of a spark ignition gasoline engine. Injectors inject an anti-knock agent such as ethanol directly into a cylinder. It is preferred that the direct injection occur after the inlet valve is closed. It is also preferred that stoichiometric operation with a three way catalyst be used to minimize emissions. In addition, it is also preferred that the anti-knock agents have a heat of vaporization per unit of combustion energy that is at least three times that of gasoline.

31 Claims, 5 Drawing Sheets

Related U.S. Application Data continuation of application No. 15/919,175, filed on Mar. 12, 2018, now Pat. No. 10,221,783, which is a continuation of application No. 15/463,100, filed on Mar. 20, 2017, now abandoned, which is a continuation of application No. 14/807,125, filed on Jul. 23, 2015, now Pat. No. 9,708,965, which is a continuation of application No. 14/220,529, filed on Mar. 20, 2014, now abandoned, which is a continuation of application No. 13/546,220, filed on Jul. 11, 2012, now abandoned, which is a continuation of application No. 12/701,034, filed on Feb. 5, 2010, now Pat. No. 8,468,983, which is a continuation of application No. 11/758,157, filed on Jun. 5, 2007, now abandoned, which is a continuation of application No. 11/100,026, filed on Apr. 6, 2005, now Pat. No. 7,225,787, which is a continuation-in-part of application No. 10/991,774, filed on Nov. 18, 2004, now Pat. No. 7,314,033.

(51) Int. Cl.
  *F02B 51/00* (2006.01)
  *F02D 19/08* (2006.01)
  *F02D 19/12* (2006.01)
  *F02D 35/02* (2006.01)
  *F02M 25/14* (2006.01)
  *F02M 37/00* (2006.01)
  *F02D 19/06* (2006.01)
  *F02B 17/00* (2006.01)
  *F02D 13/02* (2006.01)
  *F02D 41/04* (2006.01)
  *F02D 41/30* (2006.01)
  *F02B 47/04* (2006.01)

(52) U.S. Cl.
  CPC .......... *F02B 51/00* (2013.01); *F02D 13/0215* (2013.01); *F02D 19/0636* (2013.01); *F02D 19/0655* (2013.01); *F02D 19/0665* (2013.01); *F02D 19/0671* (2013.01); *F02D 19/0689* (2013.01); *F02D 19/0692* (2013.01); *F02D 19/08* (2013.01); *F02D 19/081* (2013.01); *F02D 19/084* (2013.01); *F02D 19/12* (2013.01); *F02D 35/027* (2013.01); *F02D 41/047* (2013.01); *F02D 41/3094* (2013.01); *F02M 25/14* (2013.01); *F02M 37/0088* (2013.01); *F02D 41/0007* (2013.01); *F02D 2200/0406* (2013.01); *F02D 2200/1002* (2013.01); *Y02T 10/148* (2013.01); *Y02T 10/36* (2013.01)

(56) References Cited

U.S. PATENT DOCUMENTS

| | | |
|---|---|---|
| 3,106,194 A | 10/1963 | Cantwell et al. |
| 3,557,763 A | 1/1971 | Probst |
| 3,822,119 A | 7/1974 | Frech et al. |
| 4,031,864 A | 6/1977 | Crothers |
| 4,056,087 A | 11/1977 | Boyce |
| 4,123,997 A | 11/1978 | Oswald et al. |
| 4,182,278 A | 1/1980 | Coakwell |
| 4,216,744 A | 8/1980 | Oswald et al. |
| 4,230,072 A | 10/1980 | Noguchi et al. |
| 4,312,310 A | 1/1982 | Chivilo' et al. |
| 4,402,296 A | 9/1983 | Schwarz |
| 4,446,830 A | 5/1984 | Simko et al. |
| 4,480,616 A | 11/1984 | Takeda |
| 4,495,930 A | 1/1985 | Nakajima |
| 4,541,383 A | 9/1985 | Jessel |
| 4,594,201 A | 6/1986 | Phillips et al. |
| 4,596,217 A | 6/1986 | Bonitz et al. |
| 4,596,277 A | 6/1986 | Djordjevic |
| 4,646,691 A | 3/1987 | Kiyota et al. |
| 4,706,629 A | 11/1987 | Wineland et al. |
| 4,711,212 A | 12/1987 | Haraguchi et al. |
| 4,721,081 A | 1/1988 | Krauja et al. |
| 4,905,649 A | 3/1990 | Washino et al. |
| 4,958,598 A | 9/1990 | Fosseen |
| 4,967,714 A | 11/1990 | Inoue |
| 4,974,416 A | 12/1990 | Taylor |
| 4,993,386 A | 2/1991 | Ozasa et al. |
| 4,993,388 A | 2/1991 | Mitsumoto |
| 5,050,555 A | 9/1991 | Mitsumoto |
| 5,097,803 A | 3/1992 | Galvin |
| 5,131,228 A | 7/1992 | Mochizuki et al. |
| 5,179,923 A | 1/1993 | Tsurutani et al. |
| 5,190,001 A | 3/1993 | Dieter et al. |
| 5,203,305 A | 4/1993 | Porter et al. |
| 5,233,944 A | 8/1993 | Mochizuki |
| 5,402,763 A | 4/1995 | Saito et al. |
| 5,497,744 A | 3/1996 | Nagaosa et al. |
| 5,526,797 A | 6/1996 | Stokes |
| 5,546,908 A | 8/1996 | Stokes |
| 5,560,344 A | 10/1996 | Chan |
| 5,715,788 A | 2/1998 | Tarr et al. |
| 5,911,210 A | 6/1999 | Flach |
| 5,937,799 A | 8/1999 | Binion |
| 5,983,855 A | 11/1999 | Benedikt et al. |
| 6,073,607 A | 6/2000 | Liber |
| 6,076,487 A | 6/2000 | Wulff et al. |
| 6,155,212 A | 12/2000 | McAlister |
| 6,230,683 B1 | 5/2001 | zur Loye et al. |
| 6,260,525 B1 | 7/2001 | Moyer |
| 6,287,351 B1 | 9/2001 | Wulff et al. |
| 6,293,246 B1 | 9/2001 | Tanahashi et al. |
| 6,298,838 B1 | 10/2001 | Huff et al. |
| 6,321,692 B1 | 11/2001 | Rayner |
| 6,332,448 B1 | 12/2001 | Ilyama et al. |
| 6,340,015 B1 | 1/2002 | Benedikt et al. |
| 6,358,180 B1 | 3/2002 | Kuroda et al. |
| 6,508,233 B1 | 1/2003 | Suhre et al. |
| 6,513,505 B2 | 2/2003 | Watanabe et al. |
| 6,536,405 B1 | 3/2003 | Rieger et al. |
| 6,543,423 B2 | 4/2003 | Dobryden et al. |
| 6,555,324 B1 | 4/2003 | Olweus et al. |
| 6,561,157 B2 * | 5/2003 | zur Loye ................ F02B 1/04 123/295 |
| 6,575,147 B2 | 6/2003 | Wulff et al. |
| 6,622,663 B2 | 9/2003 | Weissman et al. |
| 6,622,664 B2 | 9/2003 | Holder et al. |
| 6,651,432 B1 | 11/2003 | Gray, Jr. |
| 6,660,050 B1 | 12/2003 | Dieckmann et al. |
| 6,668,804 B2 | 12/2003 | Dobryden et al. |
| 6,681,752 B1 | 1/2004 | Kreikemeier et al. |
| 6,684,849 B2 | 2/2004 | zur Loye et al. |
| 6,711,893 B2 | 3/2004 | Ueda et al. |
| 6,725,827 B2 | 4/2004 | Ueda et al. |
| 6,745,744 B2 | 6/2004 | Suckewer et al. |
| 6,748,918 B2 | 6/2004 | Rieger et al. |
| 6,755,175 B1 | 6/2004 | McKay et al. |
| 6,799,551 B2 | 10/2004 | Nakakita et al. |
| 6,892,691 B1 | 5/2005 | Uhl et al. |
| 6,907,870 B2 | 6/2005 | zur Loye et al. |
| 6,928,983 B2 | 8/2005 | Mashiki |
| 6,951,202 B2 | 10/2005 | Oda |
| 6,955,154 B1 | 10/2005 | Douglas |
| 6,959,693 B2 | 11/2005 | Oda |
| 6,978,762 B2 | 12/2005 | Mori |
| 6,981,487 B2 | 1/2006 | Ohtani |
| 6,988,485 B2 | 1/2006 | Ichise et al. |
| 6,990,956 B2 | 1/2006 | Niimi |
| 7,013,847 B2 | 3/2006 | Auer |
| 7,021,277 B2 * | 4/2006 | Kuo .................... F02D 13/0215 123/295 |
| 7,055,500 B2 | 6/2006 | Miyashita et al. |
| 7,077,100 B2 | 7/2006 | Vogel et al. |
| 7,082,926 B2 | 8/2006 | Sadakane et al. |
| 7,086,376 B2 | 8/2006 | McKay |

(56) References Cited

U.S. PATENT DOCUMENTS

| | | | |
|---|---|---|---|
| 7,107,942 B2 | 9/2006 | Weissman et al. | |
| 7,156,070 B2 | 1/2007 | Strom et al. | |
| 7,159,568 B1 | 1/2007 | Lewis et al. | |
| 7,178,327 B2 | 2/2007 | Miyashita | |
| 7,178,503 B1 | 2/2007 | Brehob | |
| 7,188,607 B2* | 3/2007 | Kobayashi | F02B 1/12 123/299 |
| 7,198,031 B2 | 4/2007 | Saito et al. | |
| 7,201,136 B2 | 4/2007 | McKay et al. | |
| 7,207,315 B2 | 4/2007 | Maruyama | |
| 7,225,787 B2* | 6/2007 | Bromberg | F02B 47/04 123/198 A |
| 7,287,509 B1 | 10/2007 | Brehob | |
| 7,293,552 B2 | 11/2007 | Leone et al. | |
| 7,302,933 B2 | 12/2007 | Kerns | |
| 7,314,033 B2 | 1/2008 | Cohn et al. | |
| 7,320,302 B2 | 1/2008 | Kobayashi | |
| 7,389,751 B2 | 6/2008 | Leone | |
| 7,395,786 B2 | 7/2008 | Leone et al. | |
| 7,406,947 B2 | 8/2008 | Lewis et al. | |
| 7,410,514 B2 | 8/2008 | Binions | |
| 7,424,881 B2 | 9/2008 | Kerns | |
| 7,426,908 B2 | 9/2008 | Brehob | |
| 7,426,925 B2 | 9/2008 | Leone et al. | |
| 7,444,987 B2 | 11/2008 | Cohn et al. | |
| 7,461,628 B2 | 12/2008 | Blumberg et al. | |
| 7,533,651 B2 | 5/2009 | Surnilla | |
| 7,546,835 B1 | 6/2009 | Hilditch | |
| 7,581,528 B2 | 9/2009 | Stein et al. | |
| 7,694,666 B2 | 4/2010 | Lewis et al. | |
| 7,971,575 B2 | 7/2011 | Lewis et al. | |
| 8,082,735 B2 | 12/2011 | Bromberg et al. | |
| 8,146,568 B2 | 4/2012 | Cohn et al. | |
| 8,165,780 B2 | 4/2012 | Russell | |
| 8,245,690 B2 | 8/2012 | Stein | |
| 8,275,538 B2 | 9/2012 | Surnilla et al. | |
| 8,342,158 B2 | 1/2013 | Ulrey et al. | |
| 8,352,162 B2 | 1/2013 | Leone et al. | |
| 8,387,591 B2 | 3/2013 | Surnilla et al. | |
| 8,413,643 B2 | 4/2013 | Pursifull et al. | |
| 8,468,983 B2 | 6/2013 | Cohn et al. | |
| 8,483,937 B2 | 7/2013 | Surnilla et al. | |
| 8,495,983 B2 | 7/2013 | Zubeck et al. | |
| 8,516,991 B2 | 8/2013 | Tanno et al. | |
| 8,522,758 B2 | 9/2013 | Bromberg et al. | |
| 9,708,965 B2 | 7/2017 | Bromberg et al. | |
| 10,221,783 B2 | 3/2019 | Bromberg et al. | |
| 2002/0007816 A1 | 1/2002 | Zur Loye et al. | |
| 2002/0014226 A1 | 2/2002 | Wulff et al. | |
| 2002/0014228 A1 | 2/2002 | Yamada et al. | |
| 2002/0139321 A1 | 10/2002 | Weissman et al. | |
| 2003/0121471 A1 | 7/2003 | Kodou et al. | |
| 2003/0121481 A1 | 7/2003 | Dodd et al. | |
| 2004/0065274 A1 | 4/2004 | Cohn et al. | |
| 2005/0042487 A1 | 2/2005 | Surampudi et al. | |
| 2005/0056264 A1 | 3/2005 | Weissman et al. | |
| 2005/0098157 A1 | 5/2005 | Ohtani | |
| 2005/0199218 A1 | 9/2005 | Hashima et al. | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2007/0034192 A1 | 2/2007 | Kamio et al. | |
| 2007/0039588 A1 | 2/2007 | Kobayashi | |
| 2007/0119391 A1 | 5/2007 | Fried et al. | |
| 2007/0119416 A1* | 5/2007 | Boyarski | F02D 19/0692 123/304 |
| 2007/0119421 A1* | 5/2007 | Lewis | F02D 41/0025 123/431 |
| 2007/0125321 A1 | 6/2007 | Ritter | |
| 2007/0215072 A1 | 9/2007 | Dearth et al. | |
| 2007/0289573 A1 | 12/2007 | Leone et al. | |
| 2008/0060612 A1 | 3/2008 | Cohn et al. | |
| 2008/0060627 A1 | 3/2008 | Bromberg et al. | |
| 2008/0127933 A1 | 6/2008 | Blumberg et al. | |
| 2008/0168966 A1 | 7/2008 | Bromberg et al. | |
| 2009/0107031 A1 | 4/2009 | Connor | |
| 2009/0112450 A1 | 4/2009 | Connor | |
| 2009/0271090 A1* | 10/2009 | Surnilla | F02D 19/0628 701/103 |
| 2009/0276142 A1 | 11/2009 | Leone et al. | |
| 2010/0006050 A1 | 1/2010 | Bromberg et al. | |
| 2010/0030451 A1 | 2/2010 | Lippa et al. | |
| 2010/0065016 A1 | 3/2010 | Bromberg et al. | |
| 2010/0101529 A1 | 4/2010 | Lewis et al. | |
| 2010/0112391 A1 | 5/2010 | Salloum et al. | |
| 2010/0116244 A1 | 5/2010 | Lewis et al. | |
| 2010/0199946 A1 | 8/2010 | Cohn et al. | |
| 2010/0288232 A1 | 11/2010 | Bromberg et al. | |
| 2010/0318284 A1 | 12/2010 | Surnilla et al. | |
| 2011/0120569 A1 | 5/2011 | Bromberg et al. | |
| 2011/0126797 A1 | 6/2011 | Russell | |
| 2012/0048231 A1 | 3/2012 | Bromberg et al. | |
| 2012/0048234 A1 | 3/2012 | Hamama et al. | |
| 2012/0138015 A1 | 6/2012 | Cohn et al. | |
| 2012/0285429 A1 | 11/2012 | Bromberg et al. | |
| 2013/0284145 A1 | 10/2013 | Surnilla et al. | |
| 2014/0200796 A1 | 7/2014 | Bidner et al. | |
| 2014/0238340 A1 | 8/2014 | Dunn et al. | |
| 2014/0261345 A1 | 9/2014 | Bromberg et al. | |
| 2014/0358407 A1 | 12/2014 | Pursifull et al. | |
| 2015/0052877 A1 | 2/2015 | Leone | |
| 2015/0114359 A1* | 4/2015 | Leone | F02M 25/0872 123/518 |
| 2015/0285179 A1 | 10/2015 | Cohn et al. | |
| 2015/0322905 A1 | 11/2015 | Dearth | |
| 2015/0354492 A1 | 12/2015 | Surnilla et al. | |
| 2015/0369117 A1 | 12/2015 | Bromberg et al. | |
| 2016/0131048 A1 | 5/2016 | Surnilla et al. | |
| 2016/0169144 A1 | 6/2016 | Surnilla et al. | |
| 2016/0377013 A1 | 12/2016 | Yamashita et al. | |
| 2017/0159614 A1 | 6/2017 | Miller et al. | |
| 2017/0191430 A1 | 7/2017 | Bromberg et al. | |
| 2017/0204803 A1 | 7/2017 | Pursifull et al. | |
| 2018/0202375 A1 | 7/2018 | Bromberg et al. | |
| 2019/0153968 A1 | 5/2019 | Bromberg et al. | |

FOREIGN PATENT DOCUMENTS

| | | |
|---|---|---|
| JP | H02191819 A | 7/1990 |
| JP | H10252512 A | 9/1998 |
| JP | 2000179368 A | 6/2000 |
| JP | 2002227697 A | 8/2002 |
| JP | 200313784 A | 1/2003 |
| JP | 2005054758 A | 3/2005 |
| JP | 2006348799 A | 12/2006 |
| JP | 2007056754 A | 3/2007 |
| JP | 2009215908 A | 9/2009 |

OTHER PUBLICATIONS

[No Author Listed] "Alternative Automotive Fuels," J1297_200209, Society of Automotive Engineers (SAE) Information Report, Sep. 13, 2002.

[No Author Listed] Case No. IPR2019-01399, U.S. Pat. No. 9,810,166, "Declaration of Dr. James L. Mullins under 37 C.F.R. § 1.68 from IPR2019-01399," Jul. 26, 2019, 110 pages.

[No Author Listed] Case No. IPR2019-01399, U.S. Pat. No. 9,810,166, "Declaration of Dr. Nigel N. Clark under 37 C.F.R. § 1.68 from IPR2019-01399," Jul. 31, 2019, 356 pages.

[No Author Listed] Case No. IPR2019-01399, U.S. Pat. No. 9,810,166, *Ford Motor Company* vs. *Ethanol Boosting Systems, LLC, and Massachusetts Institute of Technology*, "Petition for Inter Partes Review under 35 U.S.C. § 312 and 37 C.F.R. 42.014".

[No Author Listed] Case No. IPR2019-01400, U.S. Pat. No. 8,069,839, "Declaration of Dr. James L. Mullins under 37 C.F.R. § 1.68 from IPR2019-01400," Jul. 26, 2019, 110 pages.

[No Author Listed] Case No. IPR2019-01400, U.S. Pat. No. 8,069,839, "Declaration of Dr. Nigel N. Clark under 37 C.F. R. § 1.68 from IPR2019-01400," Jul. 31, 2019, 130 pages.

[No Author Listed] Case No. IPR2019-01400, U.S. Pat. No. 8,069,839, *Ford Motor Company* vs. *Ethanol Boosting Systems, LLC, and*

(56) References Cited

OTHER PUBLICATIONS

*Massachusetts Institute of Technology*, "Petition for Inter Partes Review under 35 U.S.C. 312 and 37 C.F.R. 42.014".
[No Author Listed] Case No. IPR2019-01401, U.S. Pat. No. 9,255,519, "Declaration of Dr. James L. Mullins under 37 C.F.R. § 1.68 from IPR2019-01401," Jul. 26, 2019, 110 pages.
[No Author Listed] Case No. IPR2019-01401, U.S. Pat. No. 9,255,519, "Declaration of Dr. Nigel N. Clark under 37 C.F.R. § 1.68 from IPR2019-01401," Aug. 2, 2019, 271 pages.
[No Author Listed] Case No. IPR2019-01401, U.S. Pat. No. 9,255,519, *Ford Motor Company* vs. *Ethanol Boosting Systems, LLC, and Massachusetts Institute of Technology*, "Petition for Inter Partes Review under 35 U.S.C. 312 and 37 C.F.R. 42.014".
[No Author Listed] Case No. IPR2019-01402, U.S. Pat. No. 10,138,826, "Declaration of Dr. James L. Mullins under 37 C.F.R. § 1.68 from IPR2019-01402," Jul. 26, 2019, 110 pages.
[No Author Listed] Case No. IPR2019-01402, U.S. Pat. No. 10,138,826, "Declaration of Dr. Nigel N. Clark under 37 C.F.R. § 1.68 from IPR2019-01402," Aug. 2, 2019, 468 pages.
[No Author Listed] Case No. IPR2019-01402, U.S. Pat. No. 10,138,826, *Ford Motor Company* vs. *Ethanol Boosting Systems, LLC, and Massachusetts Institute of Technology*, "Petition for Inter Partes Review under 35 U.S.C. 312 and 37 C.F.R. 42.014".
[No Author Listed] Case No. IPR2020-00010, U.S. Pat. No. 9,810,166, *Ford Motor Company* vs. *Ethanol Boosting Systems, LLC, and Massachusetts Institute of Technology*, "Petition for Inter Partes Review under 35 U.S.C. §312 and 37 C.F.R. §42.104," Oct. 16, 2019, 92 pages.
[No Author Listed] Case No. IPR2020-00011, U.S. Pat. No. 9,255,519, *Ford Motor Company* vs. *Ethanol Boosting Systems, LLC, and Massachusetts Institute of Technology*, "Petition for Inter Partes Review under 35 U.S.C. §312 and 37 C.F.R. §42.104," Oct. 16, 2019, 98 pages.
[No Author Listed] Case No. IPR2020-00012, U.S. Pat. No. 10,138,826, *Ford Motor Company* vs. *Ethanol Boosting Systems, LLC, and Massachusetts Institute of Technology*, "Petition for Inter Partes Review under 35 U.S.C. §312 and 37 C.F.R. §42.104," Oct. 16, 2019, 95 pages.
[No Author Listed] Case No. IPR2020-00013, U.S. Pat. No. 8,069,839, *Ford Motor Company* vs. *Ethanol Boosting Systems, LLC, and Massachusetts Institute of Technology*, "Petition for Inter Partes Review under 35 U.S.C. §312 and 37 C.F.R. §42.104," Oct. 16, 2019, 71 pages.
[No Author Listed] Ford's Ethanol Boost Engine Code—Named Bobcat—Ford Powertrain Tech—Blue Oval Forums, https://blueovalforums.com/forums/index.php?/topic/26594-fords-ethanol-boost-engine-code-named-bobcat/ (posts dated Sep. 2 and 3, 2008) (access date illustrated as Aug. 29, 2019). (12 pages).
[No Author Listed] Startup Working to Commercialize Direct Injection Ethanol Boosting & Turbocharging—Green Car Congress, Oct. 25, 2006, https://www.greencarcongress.com/2006/10/startup_working.html (access date illustrated as Aug. 12, 2019). (20 pages).
[No Author Listed], "Lexus GS 450h, ou les demieres evolutions du systeme hybride Toyota," Ingenieurs de L'Automobile 2006 (May-Jun. Supplement on Alternative Energy Sources) No. 782, pp. 16-17. (French only) (2 pages).
[No Author Listed], "Pour qui roulent les Euro 5 et 6?" ("Who are the Euro 5 and 6 batting for?"), Ingenieurs de L'Automobile 2007 (Jan.-Feb. 2007) No. 786, pp. 36-40 (pp. 46-50). (10 pages).
Alkidas, et al., "Combustion advancements in gasoline engines," Energy Conversion & Management, 2007. (11 pages).
Alkidas, et al., "Contributions to the Fuel Economy Advantage of DISI Engines Over PFI Engines," SAE Technical Paper Series, 2003. (19 pages).
Anderson, R.W. et al., "Understanding the Thermodynamics of Direct Injection Spark Ignition (DISI) Combustion Systems: An Analytical and Experimental Investigation.", presented at SAE International Fall Fuels & Lubricants Meeting, 962018, 1996.
B. Lecointe and G. Monnier, "Downsizing a gasoline engine using turbocharging with direct injection" SAE paper 2003-01-0542.
Bosch Automotive Handbook (3rd Edition).
Bromberg, L., et al. Calculations of Knock Suppression in Highly Turbocharged Gasoline/Ethanol Engines Using Direct Ethanol Injection, 2006, pp. 1-17, MIT Laboratory for Energy and the Environment Report, Cambridge, MA.
Burger et al., "Performance Study of a Multifuel Engine Operating Simulataneously with CNG and Ethanol in Various Proportions," SAE Technical Paper Series, 2008. (8 pages).
Checkel et al., "Performance and Emissions of a Converted RABA 2356 Bus Engine in Diesel and Dual Fuel Diesel/Natural Gas Operation," SAE Technical Paper Series, 1993. (11 pages).
Checkel, et al., "An Optimized Diesel Dual Fuel Urban Delivery Truck," Oct. 1996. (12 pages).
Csere, C, "A Smarter Way to use Ethanol to Reduce Gasoline Consumption.", (2007), https://www.caranddriver.com/features/a15147006/a-smarter-way-to-use-ethanol-to-reduce-gasoline-consumption/.
Curran, H.J. et al., "A comprehensive modeling study of iso-octane oxidation," Combustion and Flame 129:263-280 (2002) pp. 253-280.
Durell et al, Abstract for "Emissions results from port injection and direct injection bi-fuel (gasoline and compressed natural gas) engines," Institution of Mechanical Engineers in United Kingdom, International Conference on 21st Century Emissions Technology, 2000. (1 page).
Eiser et al., "The New 1.8 L TFSI Engine from Audi, Part 1: Base Engine and Thermomanagement," Industry Gasoline Engines, vol. 72, pp. 32-39, Jun. 2011. (8 pages).
Fuerhapter, et al., "CSI—Controlled Auto Ignition—the Best Solution for the Fuel Consumption—Versus Emission Trade-Off?" SAE International, 2003. (10 pages).
Grandin, Borje and Hans-Erik Angstrom, Replacing Fuel Enrichment in a Turbo Charged SI Engine: Lean Burn or Cooled EGR, Society of Automotive Engineers, Inc., technical paper, 1999-1-3505, 1999 <https://doi.org/10.4271/1999-01-3505>.
Grandin, Borje, Hans-Erik Angstrom, Per St Alhammar and Eric Olofsson, Knock Suppression in a Turbocharged SI Engine by Using Cooled EGR, Society of Automotive Engineers, Inc. 982476, International Fall Fuels and Lubricants Meeting and Exposition in San Francisco, California (Oct. 19-22, 1998).
Harrington, et al., "Direct Injection of Natural Gas in a Heavy-Duty Diesel Engine," SAE Technical Paper Series, 2002. (12 pages).
Heiduk et al., "Die neue Motorengeneration des R4 TFSI von Audi" ("The new engine generation of the R4 TFSI from Audi," 32nd Vienna Engine Symposium, May 2011, pp. 73-98 (in German with English Abstract). (26 pages).
Heiduk et al., "The New 1.8 L TFSI Engine from Audi, Part 2: Mixture Formation, Combustion Method and Turbocharging," Industry Gasoline Engines, vol. 72, pp. 58-64, Jul./Aug. 2011. (7 pages).
Heywood, J. B., "Internal Combustion Engine Fundamentals," McGraw Hill, 1988, p. 477.
Hiraya, et al., "A Study on Gasoline Fueled Compression Ignition Engine~A Trial of Operation Region Expansion~" SAE Technical Paper Series, 2002. (11 pages).
Ikoma et al., "Development of V-6 3.5-liter Engine Adopting New Direct Injection System," SAE World Congress (Apr. 3-6, 2006). (13 pages).
Kanda et al., "Application of a New Combustion Concept to Direct Injection Gasoline Engine," SAE Technical Paper Series, 2000. (10 pages).
Kim, et al., "The Development of a Dual-Injection Hydrogen-Fueled Engine With High Power and High Efficiency," Journal of Engineering for Gas Turbines and Power, vol. 128, pp. 203-212, Jan. 2006. (10 pages).
Lake et al., "Turbocharging Concepts for Downsized DI Gasoline Engines," SAE Technical Paper Series, 2004. (13 pages).
Lee, et al., "The Development of a Dual-Injection Hydrogen-Fueled Engine With High Power and High Efficiency," 2002 Fall Technical Conference of the ASME Internal Combustion Engine Division, Sep. 8-11, 2002, New Orleans, Louisiana, USA. (9 pages).
Lee, R. J., et al., CHEMKIN 4.0 Theory Manual; Reaction Design, Inc., San Diego, Calif. (2004).

(56) References Cited

OTHER PUBLICATIONS

Lerch, Andreas, "Einspritzung bei Lexus: Direkt und indirekt," ("Injection at Lexus: Direct and Indirect") Auto & Tech. Dec. 2007, pp. 22-25. (10 pages).

Lexus IS-F 2008, model year 2007, indicated to have made its public debut in Jan. 2007 and offered for sale in early 2008, as asserted at pp. 24 and 342-344 of the Invalidity Contentions [NPL No. 34], and as allegedly supported by NPL No. 24 (note—no single NPL directly corresponds to this entry).

Lexus IS350 3.5-liter V-6, model year 2006, indicated to have made its public debut in Mar. or Apr. 2005 and offered for sale as early as Sep. or Oct. 2005, as asserted at pp. 24 and 340-342 of the Invalidity Contentions [NPL No. 34], and as allegedly supported by NPL Nos. 15, 39, and 41 (note—no single NPL directly corresponds to this entry).

Lithgow, Ian, "2UR-GSE Lexus Engine," http://australiancar.reviews/2UR-GSE-engine.php, Dec. 31, 2014. (7 pages).

LoRusso, Julian A., et al., Direct Injection Ignition Assisted Alcohol Engine, Society of Automotive Engineers, Inc. 880495, International Congress and Exposition in Detroit Michigan (Feb. 29-Mar. 4, 1998).

Miyamoto, et al., "Combustion and Emissions in a New Concept DI Stratified Charge Engine with Two-Stage Fuel Injection," SAE Technical Paper Series, 1994. (10 pages.

Modak, A., et al., Engine Cooling by Direct Injection of Cooling Water, Society of Automotive Engineers, Inc. technical paper 700887, 1970. DOI: 10.4271/700887.

Pace et al., "Air-to-Fuel and Dual-Fuel Ratio Control of an Internal Combustion Engine," SAE Int. J. Engines, vol. 2, Issue 2, pp. 245-253, 2009. (9 pages).

Pan et al., "End Gas Inhomogeneity, Autoignition and Knock," SAE Technical Paper Series, 1998. (17 pages).

PCT International Search Report and Written Opinion, Appl. No. PCT/US05/041317, dated Apr. 6, 2006.

PCT International Search Report and Written Opinion, Appl. No. PCT/US06/012750, dated Jun. 28, 2007.

PCT International Search Report and Written Opinion, Application No. PCT/1807/03004, dated Jul. 9, 2008.

PCT International Search Report and Written Opinion, Application No. PCT/US07/05777, dated Mar. 24, 2008.

PCT International Search Report and Written Opinion, Application No. PCT/US07/74227, dated Feb. 25, 2008.

PCT International Search Report and Written Opinion, Application No. PCT/US08/69171, dated Oct. 3, 2008.

Ponticel et al., "Lexus packs IS with high-tech punch," Automotive Engineering International Global Vehicles, pp. 12 & 14, Dec. 2005. (2 pages).

Roberts, S. R., "Non-Intrusive Knock Detection in a Turbocharged, Dual Fuel Engine," University of Alberta, Department of Mechanical Engineering, 1997. (30 pages).

Shelby, et al., "Early Spray Development in Gasoline Direct-Injected Spark Ignition Engines," SAE Technical Paper Series, 1998. (20 pages).

Simanaitis, Dennis, "Ethanol Boost," Road & Track, Apr. 17, 2009, https://www.roadandtrack.com/new-cars/car-technology/news/a14799/ethanol-boost/ (access date illustrated as Aug. 12, 2019). (7 pages).

Stan, C., R., et al., Internal Mixture Formation and Combustion—from Gasoline to Ethanol, Society of Automotive Engineers, Inc., 2001 World Congress, Mar. 2001, DOI: 10.4271/2001-01-1207.

Stein, R et al., "Optimal Use of E85 in a Turbocharged Direct Injection Engine," SAE International Journal of Fuels and Lubricants, vol. 2, No. 1, pp. 670-682, 2009. (13 pages).

Stokes, J., et al., "A Gasoline Engine Concept for Improved Fuel Economy—The Lean Boost System," SAE Technical Paper 2000-01-2902, 2000, <https://doi.org/10.4271/2000-01-2902>, pp. 1-12.

Sugiyama et al., "Toyota's New Spark-Ignited Engine Line-Up and Environmental Technologies for Sustainable Mobility," 2008. (20 pages).

The Ford Motor Company in the Ethanol Boosting Systems, LLC and The Massachusetts Institute of Technology, "Defendant's Answer, Defense, Counterclaims and Jury Demand", Mar. 25, 2019.

Thomas, J., et al, "Fuel-Borne Reductants for NOx Aftertreatment: Preliminary EtOH SCR Study," 2003 DEER (Diesel Engine Emissions Reduction] Workshop, Newport RI Aug. 2003].

Tsuji et al., "The new 3.5L V6 Gasoline Engine adopting the Innovative Stoichiometric Direct Injection System D-4S," 2006. (12 pages).

Ueda, T, "Innovative Development Methodology Based on the Toyota Way," Internationales Wiener Motorensymposium 2007. (15 pages).

Urushihara et al., "A Study of a Gasoline-fueled Compression Ignition Engine~Expansion of HCCI Operation Range Using SI Combustion as a Trigger of Compression Ignition," SAE Technical Paper Series, 2005. (9 pages).

USPTO Final Office Action, U.S. Appl. No. 10/991,774, dated Sep. 27, 2006.

USPTO Final Office Action, U.S. Appl. No. 11/682,372, dated Oct. 17, 2008.

USPTO Final Office Action, U.S. Appl. No. 13/546,220, dated Oct. 9, 2013.

USPTO Non-Final Office Action, U.S. Appl. No. 10/991,774, dated Apr. 25, 2006.

USPTO Non-Final Office Action, U.S. Appl. No. 10/991,774, dated May 25, 2007.

USPTO Non-Final Office Action, U.S. Appl. No. 11/100,026, dated Aug. 3, 2006.

USPTO Non-Final Office Action, U.S. Appl. No. 11/229,755, dated Mar. 22, 2007.

USPTO Non-Final Office Action, U.S. Appl. No. 11/229,755, dated Oct. 4, 2007.

USPTO Non-Final Office Action, U.S. Appl. No. 11/682,372, dated Jan. 2, 2008.

USPTO Non-Final Office Action, U.S. Appl. No. 11/684,100, dated Jun. 3, 2008.

USPTO Non-Final Office Action, U.S. Appl. No. 11/840,719, dated Jul. 11, 2008.

USPTO Non-Final Office Action, U.S. Appl. No. 15/463,100, dated Nov. 13, 2017.

USPTO Notice of Allowance, U.S. Appl. No. 11/684,100, dated Mar. 3, 2009.

Whitaker, P, "Turbocharged Spark Ignited Direct Injection—A Fuel Economy Solution for the US," DEER Conference 2009, Direction in Engine-Efficiency and Emissions Research. (28 pages).

Witzenburg, G, "The Story Behind Ward's Best 10 Engines," Ward's Auto World, Business Insights: Global, Jun. 1, 2008. (4 pages).

Witzenburg, G, "Toyota VWitzenburg, G, Toyota V-6: Best of Both Worlds," Gale Business Insights: Global, 2009. (4 pages).

Yamaguchi, J, "Engine Special Report: Lexus Gives V6 Dual Injection," Automotive Engineering International, SAE International, pp. 17, 18, and 20, Jan. 2006. (4 pages).

Yuksel, F., et al, The Use of Ethanol-Gasoline Blend as a Fuel in an SI Engine, Renewable Energy, vol. 29, Jun. 2004, pp. 1181-1191.

Zhao et al., "A Review of Mixture Preparation and Combustion Control Strategies for Spark-Ignited Direct-Injection Gasoline Engines," SAE Technical Paper Series, 1997. (46 pages).

Zhu et al., "Combustion Characteristics of a Single-Cylinder Engine Equipped with Gasoline and Ethanol Dual-Fuel Systems," SAE Technical Paper Series, 2008. (13 pages).

Zhu et al., "Combustion characteristics of a single-cylinder spark ignition gasoline and ethanol dual-fuelled engine," Department of Mechanical Engineering, Michigan State University, East Lansing, Michigan, USA, 2009. (17 pages).

U.S. Appl. No. 10/991,774, filed Mar. 31, 2003 Fuel Management System for Variable Ethanol Octane Enhancement of Gasoline Engines.

U.S. Appl. No. 11/100,026, filed Apr. 6, 2005 Optimized Fuel Management System for Direct Injection Ethanol Enhancement of Gasoline Engines.

(56) References Cited

OTHER PUBLICATIONS

U.S. Appl. No. 11/758,157, filed Jun. 5, 2007 Optimized Fuel Management System for Direct Injection Ethanol Enhancement of Gasoline Engines.
U.S. Appl. No. 12/020,285, filed Sep. 22, 2004 Optimized Fuel Management System for Direct Injection Ethanol Enhancement of Gasoline Engines.
U.S. Appl. No. 12/562,766, filed Sep. 18, 2009 Optimized Fuel Management System for Direct Injection Ethanol Enhancement of Gasoline Engines.
U.S. Appl. No. 12/701,034, filed Feb. 5, 2010 Optimized Fuel Management System for Direct Injection Ethanol Enhancement of Gasoline Engines.
U.S. Appl. No. 12/844,168, filed Jul. 27, 2010 Optimized Fuel Management System for Direct Injection Ethanol Enhancement of Gasoline Engines.
U.S. Appl. No. 13/291,504, filed Nov. 8, 2011 Optimized Fuel Management System for Direct Injection Ethanol Enhancement of Gasoline Engines.
U.S. Appl. No. 13/546,220, filed Jul. 11, 2012 Optimized Fuel Management System for Direct Injection Ethanol Enhancement of Gasoline Engines.
U.S. Appl. No. 14/220,529, filed Mar. 20, 2014 Optimized Fuel Management System for Direct Injection Ethanol Enhancement of Gasoline Engines.
U.S. Appl. No. 14/807,125, filed Jul. 23, 2015 Optimized Fuel Management System for Direct Injection Ethanol Enhancement of Gasoline Engines.
U.S. Appl. No. 15/463,100, filed Mar. 20, 2017 Fuel Management System for Variable Ethanol Octane Enhancement of Gasoline Engines.
U.S. Appl. No. 15/919,175, filed Mar. 12, 2018 Optimized Fuel Management System for Direct Injection Ethanol Enhancement of Gasoline Engines.
U.S. Appl. No. 16/251,658, filed Jan. 18, 2019 Optimized Fuel Management System for Direct Injection Ethanol Enhancement of Gasoline Engines.
U.S. Appl. No. 11/229,755, filed Sep. 19, 2005 Fuel Management System for Variable Anti-Knock Agent Octane Enhancement of Gasoline Engines.
U.S. Appl. No. 11/840,719, filed Aug. 17, 2007 Fuel Management System for Variable Ethanol Octane Enhancement of Gasoline Engines.
U.S. Appl. No. 11/871,384, filed Oct. 12, 2007 Fuel Management System for Variable Ethanol Octane Enhancement of Gasoline Engines.
U.S. Appl. No. 12/329,729, filed Dec. 8, 2008 Fuel Management System for Variable Ethanol Octane Enhancement of Gasoline Engines.
U.S. Appl. No. 12/621,425, filed Nov. 18, 2009 Fuel Management System for Variable Ethanol Octane Enhancement of Gasoline Engines.
U.S. Appl. No. 12/730,662, filed Mar. 24, 2010 Fuel Management System for Variable Ethanol Octane Enhancement of Gasoline Engines.
U.S. Appl. No. 12/815,842, filed Jun. 15, 2010 Fuel Management System for Variable Ethanol Octane Enhancement of Gasoline Engines.
U.S. Appl. No. 12/907,163, filed Oct. 19, 2010 Fuel Management System for Variable Ethanol Octane Enhancement of Gasoline Engines.
U.S. Appl. No. 12/942,133, filed Nov. 9, 2010 Spark Ignition Engine That Uses Intake Port Injection of Alcohol to Extend Knock Limits.
U.S. Appl. No. 13/117,448, filed May 27, 2011 Fuel Management System for Variable Ethanol Octane Enhancement of Gasoline Engines.
U.S. Appl. No. 13/282,787, filed Oct. 27, 2011 Fuel Management System for Variable Ethanol Octane Enhancement of Gasoline Engines.
U.S. Appl. No. 13/368,382, filed Feb. 8, 2012 Fuel Management System for Variable Ethanol Octane Enhancement of Gasoline Engines.
U.S. Appl. No. 13/410,373, filed Mar. 2, 2012 Fuel Management System for Variable Ethanol Octane Enhancement of Gasoline Engines.
U.S. Appl. No. 13/591,717, filed Aug. 22, 2012 Fuel Management System for Variable Ethanol Octane Enhancement of Gasoline Engines.
U.S. Appl. No. 13/629,836, filed Sep. 28, 2012 Fuel Management System for Variable Ethanol Octane Enhancement of Gasoline Engines.
U.S. Appl. No. 13/895,713, filed May 16, 2013 Fuel Management System for Variable Ethanol Octane Enhancement of Gasoline Engines.
U.S. Appl. No. 13/956,498, filed Aug. 1, 2013 Fuel Management System for Variable Ethanol Octane Enhancement of Gasoline Engines.
U.S. Appl. No. 14/133,974, filed Dec. 19, 2013 Fuel Management System for Variable Ethanol Octane Enhancement of Gasoline Engines.
U.S. Appl. No. 14/249,806, filed Apr. 10, 2014 Fuel Management System for Variable Ethanol Octane Enhancement of Gasoline Engines.
U.S. Appl. No. 14/478,069, filed Sep. 5, 2014 Fuel Management System for Variable Ethanol Octane Enhancement of Gasoline Engines.
U.S. Appl. No. 14/982,086, filed Dec. 29, 2015 Fuel Management System for Variable Ethanol Octane Enhancement of Gasoline Engines.
U.S. Appl. No. 15/463,425, filed Mar. 20, 2017 Fuel Management System for Variable Ethanol Octane Enhancement of Gasoline Engines.
U.S. Appl. No. 15/716,675, filed Sep. 27, 2017 Fuel Management System for Variable Ethanol Octane Enhancement of Gasoline Engines.
U.S. Appl. No. 16/170,648, filed Oct. 25, 2018 Fuel Management System for Variable Ethanol Octane Enhancement of Gasoline Engines.
U.S. Appl. No. 16/424,471, filed May 28, 2019 Fuel Management System for Variable Ethanol Octane Enhancement of Gasoline Engines.
IPR2019-01399, against U.S. Pat. No. 9,810,166.
IPR2019-01400, against U.S. Pat. No. 8,069,839.
IPR2019-01401, against U.S. Pat. No. 9,255,519.
IPR2019-01402, against U.S. Pat. No. 10,138,826.
IPR2020-00010, against U.S. Pat. No. 9,810,166.
IPR2020-00011, against U.S. Pat. No. 9,255,519.
IPR2020-00012, against U.S. Pat. No. 10,138,826.
IPR2020-00013, against U.S. Pat. No. 8,069,839.

\* cited by examiner

OPTIMIZED FUEL MANAGEMENT SYSTEM FOR DIRECT INJECTION ETHANOL ENHANCEMENT OF GASOLINE ENGINES

CROSS-REFERENCE TO RELATED APPLICATIONS

This application is a continuation of U.S. patent application Ser. No. 16/251,658 filed on Jan. 18, 2019, which is a continuation of U.S. patent application Ser. No. 15/919,175 filed on Mar. 12, 2018, now U.S. Pat. No. 10,221,783, which is a continuation of U.S. patent application Ser. No. 15/463,100 filed on Mar. 20, 2017, which is a continuation of U.S. patent application Ser. No. 14/807,125 filed on Jul. 23, 2015, now U.S. Pat. No. 9,708,965, which is a continuation of U.S. patent application Ser. No. 14/220,529 filed on Mar. 20, 2014, which is a continuation of U.S. patent application Ser. No. 13/546,220 filed on Jul. 11, 2012, which is a continuation of U.S. patent application Ser. No. 12/701,034 filed on Feb. 5, 2010, now U.S. Pat. No. 8,468,983, which is a continuation of U.S. patent application Ser. No. 11/758,157 filed on Jun. 5, 2007, which is a continuation of U.S. patent application Ser. No. 11/100,026, filed on Apr. 6, 2005, now U.S. Pat. No. 7,225,787, which is a continuation-in-part of U.S. patent application Ser. No. 10/991,774 filed Nov. 18, 2004, now U.S. Pat. No. 7,314,033, the contents of each which is incorporated herein by reference.

BACKGROUND OF THE INVENTION

This invention relates to an optimized fuel management system for use with spark ignition gasoline engines in which an anti-knock agent which is a fuel is directly injected into a cylinder of the engine.

There are a number of important additional approaches for optimizing direct injection ethanol enhanced knock suppression so as to maximize the increase in engine efficiency and to minimize emissions of air pollutants beyond the technology disclosed in parent application Ser. No. 10/991,774 set out above. There are also additional approaches to protect the engine and exhaust system during high load operation by ethanol rich operation; and to minimize cost, ethanol fuel use and ethanol fuel storage requirements. This disclosure describes these approaches.

These approaches are based in part on more refined calculations of the effects of variable ethanol octane enhancement using a new computer model that we have developed. The model determines the effect of direct injection of ethanol on the occurrence of knock for different times of injection and mixtures with port fuel injected gasoline. It determines the beneficial effect of evaporative cooling of the direct ethanol injection upon knock suppression.

SUMMARY OF THE INVENTION

In one aspect, the invention is a fuel management system for operation of a spark ignition gasoline engine including a gasoline engine and a source of an anti-knock agent which is a fuel. The use of the anti-knock agent provides gasoline savings both by facilitating increased engine efficiency over a drive cycle and by substitution for gasoline as a fuel. An injector is provided for direct injection of the anti-knock agent into a cylinder of the engine and a fuel management control system controls injection of the anti-knock agent into the cylinder to control knock. The injection of the antiknock agent can be initiated by a signal from a knock sensor. It can also be initiated when the engine torque is above a selected value or fraction of the maximum torque where the value or fraction of the maximum torque is a function of the engine speed. In a preferred embodiment, the injector injects the anti-knock agent after inlet valve/valves are closed. It is preferred that the anti-knock agent have a heat of vaporization that is at least twice that of gasoline or a heat of vaporization per unit of combustion energy that is at least three times that of gasoline. A preferred anti-knock agent is ethanol. In a preferred embodiment of this aspect of the invention, part of the fuel is port injected and the port injected fuel is gasoline. The directly injected ethanol can be mixed with gasoline or with methanol. It is also preferred that the engine be capable of operating at a manifold pressure at least twice that pressure at which knock would occur if the engine were to be operated with naturally aspirated gasoline. A suitable maximum ethanol fraction during a drive cycle when knock suppression is desired is between 30% and 100% by energy. It is also preferred that the compression ratio be at least 10. With the higher manifold pressure, the engine can be downsized by a factor of two and the efficiency under driving conditions increased by 30%.

It is preferred that the engine is operated at a substantially stoichiometric air/fuel ratio during part or all of the time that the anti-knock agent such as ethanol is injected. In this case, a three-way catalyst can be used to reduce the exhaust emissions from the engine. The fuel management system may operate in open or closed loop modes.

In some embodiments, non-uniform ethanol injection is employed. Ethanol injection may be delayed relative to bottom dead center when non-uniform ethanol distribution is desired.

Many other embodiments of the invention are set forth in detail in the remainder of this application.

DESCRIPTION OF THE PREFERRED EMBODIMENT

Figure 1:
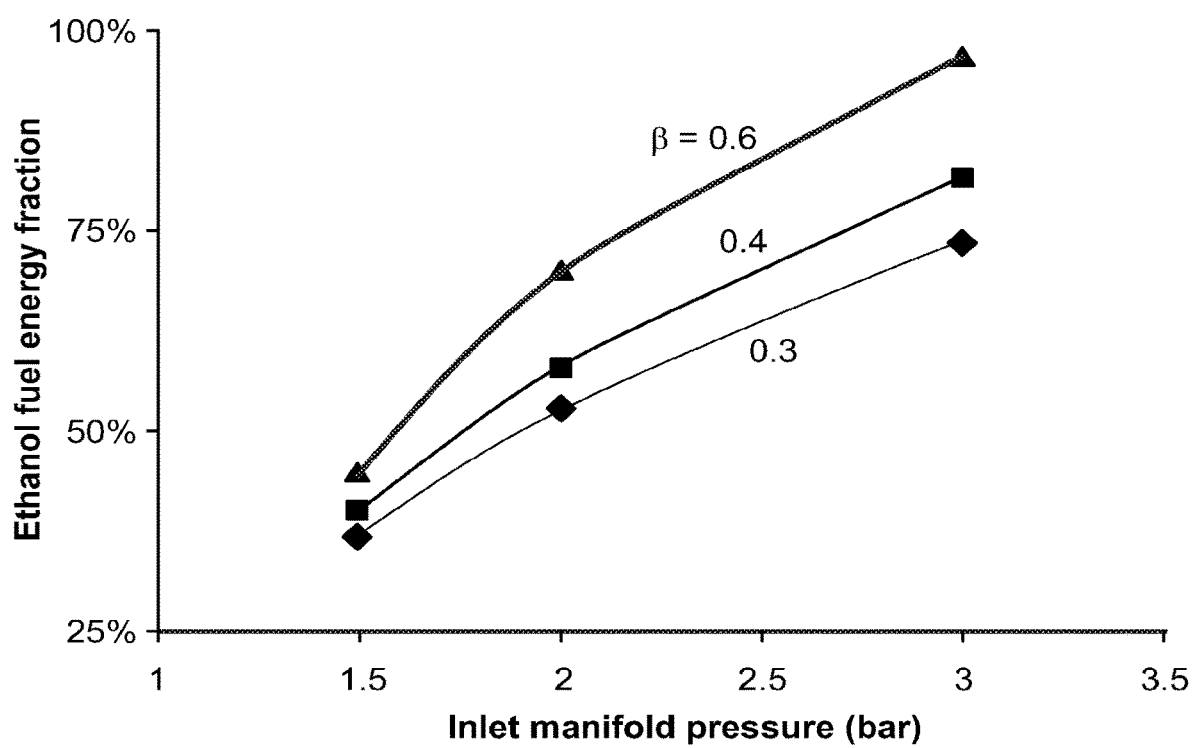
FIG. 1 is a graph of ethanol fraction (by energy) required to avoid knock as a function of inlet manifold pressure. The ethanol fraction is shown for various values of β, the ratio of the change in temperature in the air cylinder charge due to turbocharging (and aftercooling if used) to the adiabatic temperature increase of the air due to the turbocharger.

Ethanol has a heat of vaporization that is more than twice that of gasoline, a heat of combustion per kg which is about 60% of that of gasoline, and a heat of vaporization per unit of combustion energy that is close to four times that of gasoline. Thus the evaporative cooling of the cylinder air/fuel charge can be very large with appropriate direct injection of this antiknock agent. The computer model referenced below shows that evaporative cooling can have a very beneficial effect on knock suppression. It indicates that the beneficial effect can be maximized by injection of the ethanol after the inlet valve that admits the air and gasoline into the cylinder is closed. This late injection of the ethanol enables significantly higher pressure operation without knock and thus higher efficiency engine operation than would be the case with early injection. It is thus preferred to the conventional approach of early injection which is used because it provides good mixing. The model also provides information that can be used for open loop (i.e., a control system that uses predetermined information rather than feedback) fuel management control algorithms.

The increase in gasoline engine efficiency that can be obtained from direct injection of ethanol is maximized by having the capability for highest possible knock suppression enhancement. This capability allows the highest possible amount of torque when needed and thereby facilitates the largest engine downsizing for a given compression ratio.

Maximum knock suppression is obtained with 100% or close to 100% use of direct injection of ethanol. A small amount of port injection of gasoline may be useful in order to obtain combustion stability by providing a more homogeneous mixture. Port fuel injection of gasoline also removes the need for a second direct fuel system or a more complicated system which uses one set of injectors for both fuels. This can be useful in minimizing costs.

The maximum fraction of ethanol used during a drive cycle will depend upon the engine system design and the desired level of maximum torque at different engine speeds. A representative range for the maximum ethanol fraction by energy is between 20% and 100%.

In order to obtain the highest possible octane enhancement while still maintaining combustion stability, it may be useful for 100% of the fuel to come from ethanol with a fraction being port injected, as an alternative to a small fraction of the port-fueled gasoline.

The initial determination of the knock suppression by direct injection of ethanol into a gasoline engine has been refined by the development of a computer model for the onset of knock under various conditions. The computer modeling provides more accurate information for use in fuel management control. It also shows the potential for larger octane enhancements than our earlier projections. Larger octane enhancements can increase the efficiency gain through greater downsizing and higher compression ratio operation. They can also reduce the amount of ethanol use for a given efficiency increase.

The computer model combines physical models of the ethanol vaporization effects and the effects of piston motion of the ethanol/gasoline/air mixtures with a state of the art calculational code for combustion kinetics. The calculational code for combustion kinetics was the engine module in the CHEMKIN 4.0 code [R. J. Kee, F. M. Rupley, J. A. Miller, M. E. Coltrin, J. F. Grear, E. Meeks, H. K. Moffat, A. E. Lutz, G. Dixon-Lewis, M. D. Smooke, J. Warnatz, G. H. Evans, R. S. Larson, R. E. Mitchell, L. R. Petzold, W. C. Reynolds, M. Caracotsios, W. E. Stewart, P. Glarborg, C. Wang, O. Adigun, W. G. Houf, C. P. Chou, S. F. Miller, P. Ho, and D. J. Young, CHEMKIN Release 4.0, Reaction Design, Inc., San Diego, Calif. (2004)]. The CHEMKIN code is a software tool for solving complex chemical kinetics problems. This new model uses chemical rates information based upon the Primary Reference gasoline Fuel (PRF) mechanism from Curran et al. [Curran, H. J., Gaffuri, P., Pitz, W. J., and Westbrook, C. K. "A Comprehensive Modeling Study of iso-Octane Oxidation," *Combustion and Flame* 129:253-280 (2002) to represent onset of autoignition.

The compression on the fuel/air mixture end-gas was modeled using the artifact of an engine compression ratio of 21 to represent the conditions of the end gas in an engine with an actual compression ratio of 10. The end gas is defined as the un-combusted air/fuel mixture remaining after 75% (by mass) of the fuel has combusted. It is the end gas that is most prone to autoignition (knock). The larger compression ratio includes the effect of the increase in pressure in the cylinder due to the energy released in the combustion of 75% of the fuel that is not in the end gas region. The effect of direct ethanol vaporization on temperature was modeled by consideration of the effects of the latent heat of vaporization on temperature depending upon the time of the injection.

The effect of temperature increase due to turbocharging was also included. The increase in temperature with turbocharging was calculated using an adiabatic compression model of air. It is assumed that thermal transfer in the piping or in an intercooler results in a smaller temperature increase. The effect is modeled by assuming that the increase in temperature of the air charge into the cylinder $\Delta T_{charge}$ is $\Delta T_{charge} = \beta \Delta T_{turbo}$ where $\Delta T_{turbo}$ is the temperature increase after the compressor due to boosting and beta is a constant. Values of $\beta$ of 0.3, 0.4 and 0.6 have been used in the modeling. It is assumed that the temperature of the charge would be 380 K for a naturally aspirated engine with port fuel injection gasoline.

FIG. 1 shows the predictions of the above-referenced computer model for the minimum ethanol fraction required to prevent knock as a function of the pressure in the inlet manifold, for various values of $\beta$. In FIG. 1 it is assumed that the direct injection of the ethanol is late (i.e. after the inlet valve that admits air and gasoline to the cylinder is closed) and a 87 octane PRF (Primary Reference Fuel) to represent regular gasoline. The corresponding calculations for the manifold temperature are shown in Table 1 for the case of a pressure in the inlet manifold of up to 3 bar for an engine with a conventional compression ratio of 10. The temperature of the charge varies with the amount of ethanol directly injected and is self-consistently calculated in Table 1 and FIG. 1. The engine speed used in these calculations is 1000 rpm.

TABLE 1

Computer model calculations of temperature and ethanol fraction required for knock prevention for an inlet manifold pressure of 3 bar for an engine with a compression ratio of 10, for various values of β (ratio of change of the cylinder air charge temperature due to turbocharging to the adiabatic temperature increase due to turbocharging $\Delta T_{charge} = \beta \Delta T_{turbo}$). The engine speed is 1000 rpm.

| β | | 0.3 | 0.4 | 0.6 |
|---|---|---|---|---|
| T_charge init | K | 380 | 380 | 380 |
| Delta T turbo | K | 180 | 180 | 180 |
| Delta T after intercooler | K | 54 | 72 | 108 |
| Delta T due to DI ethanol and gasoline | K | −103 | −111 | −132 |
| T_init equivalent charge | K | 331 | 341 | 356 |
| Gasoline octane | | 87 | 87 | 87 |
| Ethanol fraction (by energy) needed to prevent knock | | 74% | 82% | 97% |

Direct fuel injection is normally performed early, before the inlet valve is closed in order to obtain good mixing of the fuel and air. However, our computer calculations indicate a substantial benefit from injection after the inlet valve is closed.

The amount of air is constant in the case of injection after the inlet valve has closed. Therefore the temperature change is calculated using the heat capacity of air at constant volume ($c_v$). The case of early injection where the valve that admits air and fuel to the cylinder is still open is modeled with a constant-pressure heat capacity ($c_p$). The constant volume case results in a larger evaporation induced decrease in charge temperature than in the case for constant pressure, by approximately 30%. The better evaporative cooling can allow operation at higher manifold pressure (corresponding to a greater octane enhancement) without knock that would be the case of early injection by a difference of more than 1 bar. The increase in the evaporative cooling effect at constant volume relative to that at constant pressure is substantially higher for the case of direct injection of fuels such as ethanol and methanol than is the case for direct injection of gasoline.

Figure 2A:
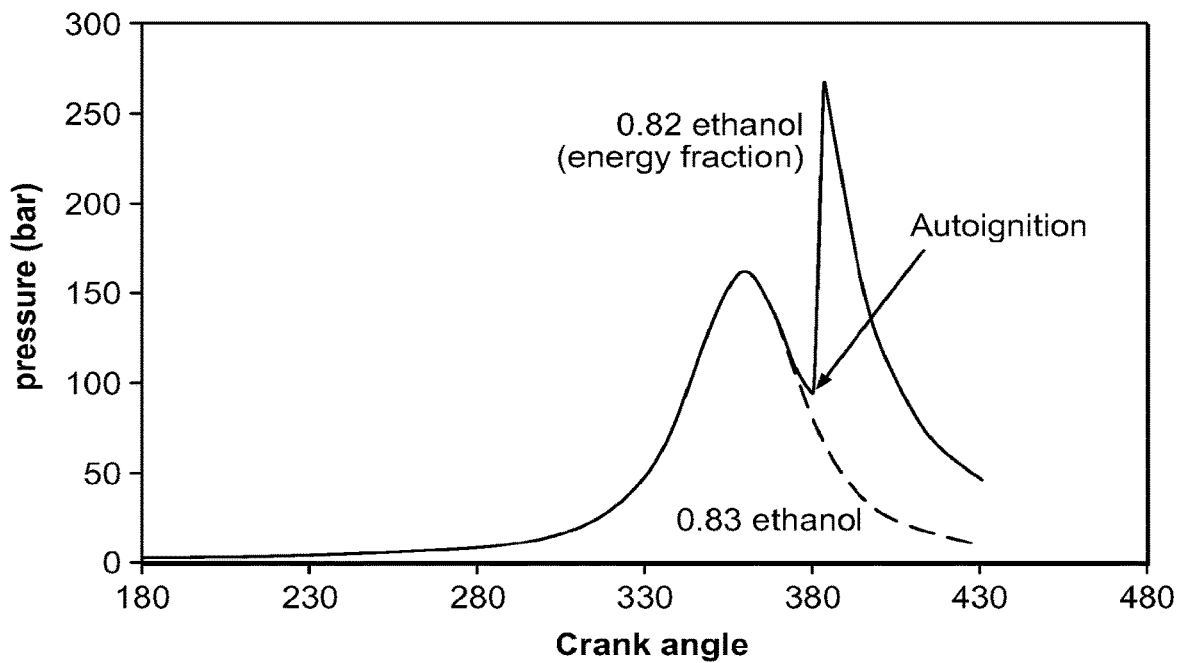
FIG. 2a is a graph of cylinder pressure as a function of crank angle for a three bar manifold pressure.
Figure 2B:
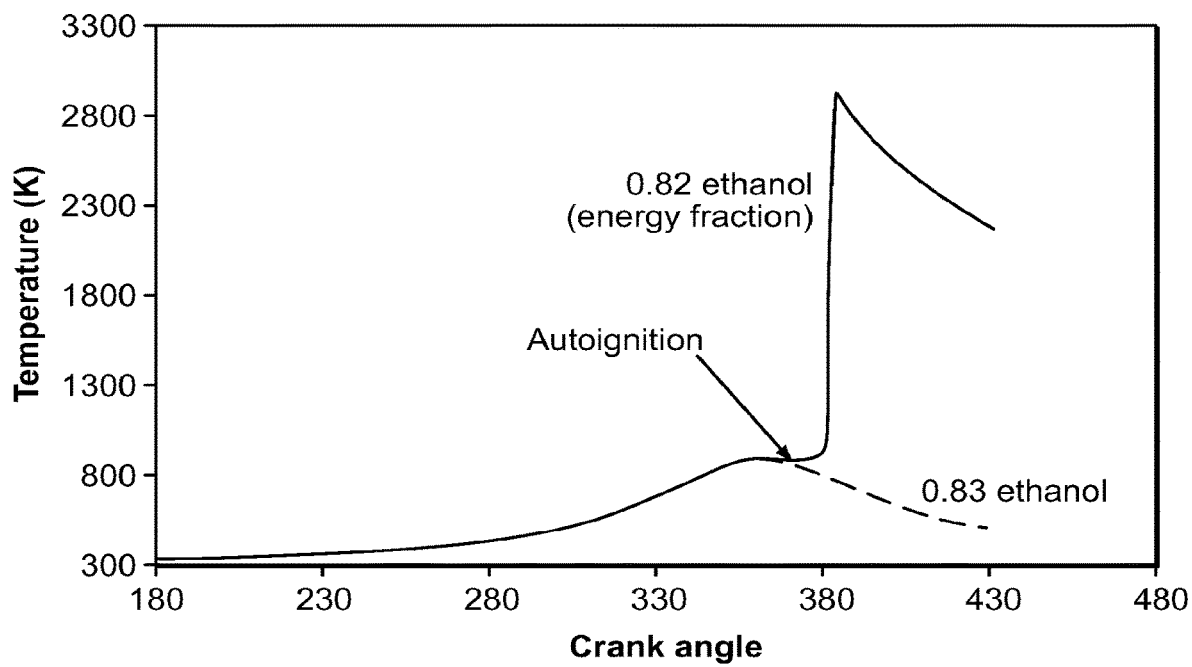
FIG. 2b is a graph of charge temperature as a function of crank angle for a three bar manifold pressure.

Typical results from the calculations are shown in FIG. 2. The figure shows the pressure (a) and the temperature (b) of the cylinder charge as a function of crank angle, for a manifold pressure of 3 bar and a value of β=0.4 Two values of the ethanol fraction are chosen, one that results in autoignition, and produces engine knock (0.82 ethanol fraction by fuel energy), and the other one without autoignition, i.e., no knock (0.83 ethanol fraction). Autoignition is a threshold phenomenon, and in this case occurs between ethanol fractions of 0.82 and 0.83. For an ethanol energy fraction of 0.83, the pressure and temperature rise at 360° (top dead center) is due largely to the compression of the air fuel mixture by the piston. When the ethanol energy fraction is reduced to 0.82, the temperature and pressure spikes as a result of autoignition. Although the autoignition in FIG. 2 occurs substantially after 360 degrees, the autoignition timing is very sensitive to the autoignition temperature (5 crank angle degrees change in autoignition timing for a change in the initial temperature of 1 K, or a change in the ethanol energy fraction of 1%).

The effect of evaporative cooling from the antiknock agent (in this case, ethanol) is shown in Table 2, where three cases are compared. The first one is with port fuel injection of ethanol. In this case the vaporization of the ethanol on the walls of the manifold has a negligible impact on the temperature of the charge to the cylinder because the walls of the manifold are cooled rather than the air charge. The second case assumes direct injection, but with the inlet valve open, with evaporation at constant pressure, where the cooling of the charge admits additional air to the cylinder. The third case assumes, as in the previous discussions, late injection after the inlet valve has closed. It is assumed stoichiometric operation, that the baseline temperature is 380 K, and that there is cooling in the manifold after the turbocharger with β=0.4.

TABLE 2

Knock-free operation of ethanol port fuel injection (assuming no charge cooling) and of direct injection before and after the inlet valve is closed. Compression ratio of 10, baseline charge temperature of 380 K, intercooler/cooling post turbo with β = 0.4, stoichiometric operation, gasoline with 87 RON. Engine speed is 1000 rpm.

|  | Evaporative cooling | | |
| --- | --- | --- | --- |
|  | No Evaporative Cooling | Before Valve Closing | After Valve Closing |
| Ethanol fraction (by energy) | 0.95 | 0.95 | 0.95 |
| Max manifold pressure (bar) | 1.05 | 2.4 | 4.0 |
| Cylinder pressure after cooling (bar) | 1.05 | 2.4 | 3.0 |
| Cylinder charge temperature after cooling (K) | 383 | 360 | 355 |

The results indicate the strong effect of the cooling. The maximum manifold pressure that prevents knock (without spark retard), with 0.95 ethanol fraction by energy in the case of port fuel injection is 1.05 bar. With direct injection of the ethanol, the maximum knock-free manifold and cylinder pressures are 2.4 bar, with a temperature decrease of the charge of ~75K. The final case, with injection after inlet valve closing, allows a manifold pressure of 4 bar, a cylinder pressure (after cooling) of 3 bar, and a charge temperature decrease of ~120K. It should be noted that the torque of the late injection case after the valve has closed is actually higher than that of the early injection case, even though the early injection case allows for additional air (at constant pressure). For comparison, the model is also used to calculate the manifold pressure at which knock would occur for port fuel injection of 87 octane gasoline alone. This pressure is ~0.8 bar assuming spark timing at MBT (Maximum Brake Torque). Conventional gasoline engines operate at 1 bar by retarding the timing at high torque regions where knock would otherwise occur. Thus the model indicates that evaporative cooling effect of direct injection of ethanol after the inlet valve has closed can be significantly greater than that of the higher octane number rating of ethanol relative to gasoline.

A manifold pressure of 4 bar is very aggressive. Table 2 is indicative of the dramatically improved performance of the system with direct injection after the inlet valve has closed. The improved performance in this case can be traded for increased compression ratio or reduced use of the anti-knock agent.

It should be noted that, as mentioned above, the calculations of autoignition (knock) are conservative, as autoignition for the case shown in FIG. 2 occurs relatively late in the cycle, and it is possible that the fuel has been combusted before it autoignites. Also it should be noted that the calculations in FIG. 2 break down after autoignition, as the pressure trace would be different from that assumed. Figures similar to FIG. 2 are used to determine conditions where autoignition would not occur, and those conditions are then used to provide the information for FIG. 1. The initial temperatures of the cases shown in FIG. 2 are 341 K for 0.82 ethanol fraction, and 340 K for 0.83 ethanol fraction, a difference of 1K (the difference due to the cooling effect of the ethanol).

Because of the large heat of vaporization, there could be enough charge cooling with early injection so that the rate of vaporization of ethanol is substantially decreased. By instead injecting into the hot gases, which is the case with injection after the inlet valve has closed, the temperature at the end of full vaporization of the ethanol is substantially increased with respect to early injection, increasing the evaporation rate and minimizing wall wetting.

The optimum timing of the injection for best mixing and a near homogeneous charge is soon after the inlet valve closes, provided that the charge is sufficiently warm for antiknock agent vaporization. If, on the other hand, a non-uniform mixture is desired in order to minimize ethanol requirements and improve ignition stability, then the injection should occur later than in the case where the best achievable mixing is the goal.

Late injection of the ethanol after the inlet valve has closed can be optimized through the use of diesel-like injection schemes, such as injectors with multiple sprays. It is important to inject the fuel relatively quickly, and at velocities which minimize any cylinder wall wetting, which as described below could result in the removal of the lubrication oils from the cylinder liner. Multiple sprays from a nozzle that has multiple holes results in a distributed pattern of sprays, with relatively low injection velocities. This is particularly important for ethanol, because of the higher volume throughputs (as compared with gasoline) of ethanol for equal energy content.

Injection after the valve has closed may require that a modest fraction of the fuel (e.g. 25%) be port injected in order to achieve the desired combustion stability. A tumble-like or swirl motion can be introduced to achieve the desired combustion stability. The port injected fuel can be either gasoline or ethanol.

Use of the computer model for operation with gasoline alone gives results that are consistent with the observed occurrence of knock in gasoline engine vehicles, thereby buttressing the credibility of the projections for ethanol. The computer model indicates that for knock-free gasoline operation alone with a compression ratio of 10, knock imposes a severe constraint upon the allowed manifold pressure for a naturally aspirated gasoline engine and very limited (i.e., less than 1.2 bar) manifold pressure can be achieved even with direct injection of gasoline unless spark retard and/or rich operation is used. These changes, however, can reduce efficiency and increase emissions.

FIG. 1 shows that knock can be prevented at manifold pressures greater than 2 bar with direct injection of an ethanol fraction of between 40 and 80% in an engine with a compression ratio of 10. The manifold pressure can be at least 2.5 bar without engine knock. A pressure of 3 bar would allow the engine to be downsized to ~⅓ of the naturally aspirated gasoline engine, while still producing the same maximum torque and power. The large boosting indicated by the calculations above may require a multiple-stage turbocharger. In addition to a multiple stage turbocharger, the turbocharger may be of the twin-scroll turbo type to optimize the turbocharging and decrease the pressure fluctuations in the inlet manifold generated by a small number of cylinders.

With an increase in allowed manifold pressure in an engine by more than a factor of 2, the engine could be downsized by a factor of 2 (that is, the cylinder volume is decreased by a factor of 2 or more) and the compression ratio could be held constant or raised. For example, the performance of an eight cylinder engine is achieved by a four cylinder engine.

The occurrence of knock at a given value of torque depends upon engine speed. In addition to providing substantially more maximum torque and power, direct injection of ethanol can be used to provide a significant improvement in torque at low engine speeds (less than 1500 rpm) by decreasing or eliminating the spark retard. Spark retard is generally used with gasoline engines to prevent knock at low engine speeds where autoignition occurs at lower values of torque than is the case at high engine speeds.

FIG. 1 can also be used to determine the ethanol fraction required to prevent knock at different levels of torque and horsepower, which scale with manifold pressure in a given size engine. This information can be used in an open loop control system.

The efficiency of a gasoline engine under driving conditions using direct ethanol injection enhancement can be at least 20% and preferably at least 30% greater than that of a naturally aspirated gasoline engine with a compression ratio of 10. This increase results from the substantial engine boosting and downsizing to give the same power, and also the high compression ratio operation (compression ratio of 11 or greater) that is enabled by a large octane enhancement. With more aggressive downsizing of more than 50% (where the same engine performance is obtained with less than one-half the displacement), the increase in efficiency could exceed 30%.

Greater downsizing and higher efficiency may also be obtained by decreasing the octane requirement of the engine by using variable valve timing (VVT). Thus, at conditions of high torque, variable valve timing can be used to decrease the compression ratio by appropriately changing the opening/closing of the inlet and exhaust valves. The loss in efficiency at high torque has a small impact on the overall fuel economy because the engine seldom operates in these conditions.

VVT can also be used to better scavenge the exhaust gases [B. Lecointe and G. Monnier, "Downsizing a Gasoline Engine Using Turbocharging with Direct Injection" SAE paper 2003-01-0542]. Decreasing the exhaust gas decreases the air/fuel temperature. Keeping both the inlet and exhaust valves open, while the pressure in the inlet manifold is higher than in the exhaust, can be used to remove the exhaust gases from the combustion chamber. This effect, coupled with slightly rich operation in-cylinder, can result in increased knock avoidance while the exhaust is still stoichiometric. Cooled EGR and spark timing adjustment can also be used to increase knock avoidance.

Any delay in delivering high engine torque at low engine speeds can decrease drivability of the vehicle. Under these conditions, because of the substantial engine downsizing, the vehicle would have insufficient acceleration at low engine speeds until the turbo produces high pressures. This delay can be removed through the use of direct injection of ethanol by reduction of the spark retard or ethanol/gasoline with rich operation and also with the use of variable valve timing.

Another approach would be to use an electrically assisted turbo charger. Units that can generate the required boosting for short periods of time are available. The devices offer very fast response time, although they have substantial power requirements.

A multiple scroll turbocharger can be used to decrease the pressure fluctuations in the manifold that could result from the decreased number of cylinders in a downsized engine.

The temperature of the air downstream from the turbocharger is increased by the compression process. Use of an intercooler can prevent this temperature increase from increasing the engine's octane requirement. In addition, in order to maximize the power available from the engine for a given turbocharging, cooling of the air charge results in increased mass of air into the cylinder, and thus higher power.

Figure 3:
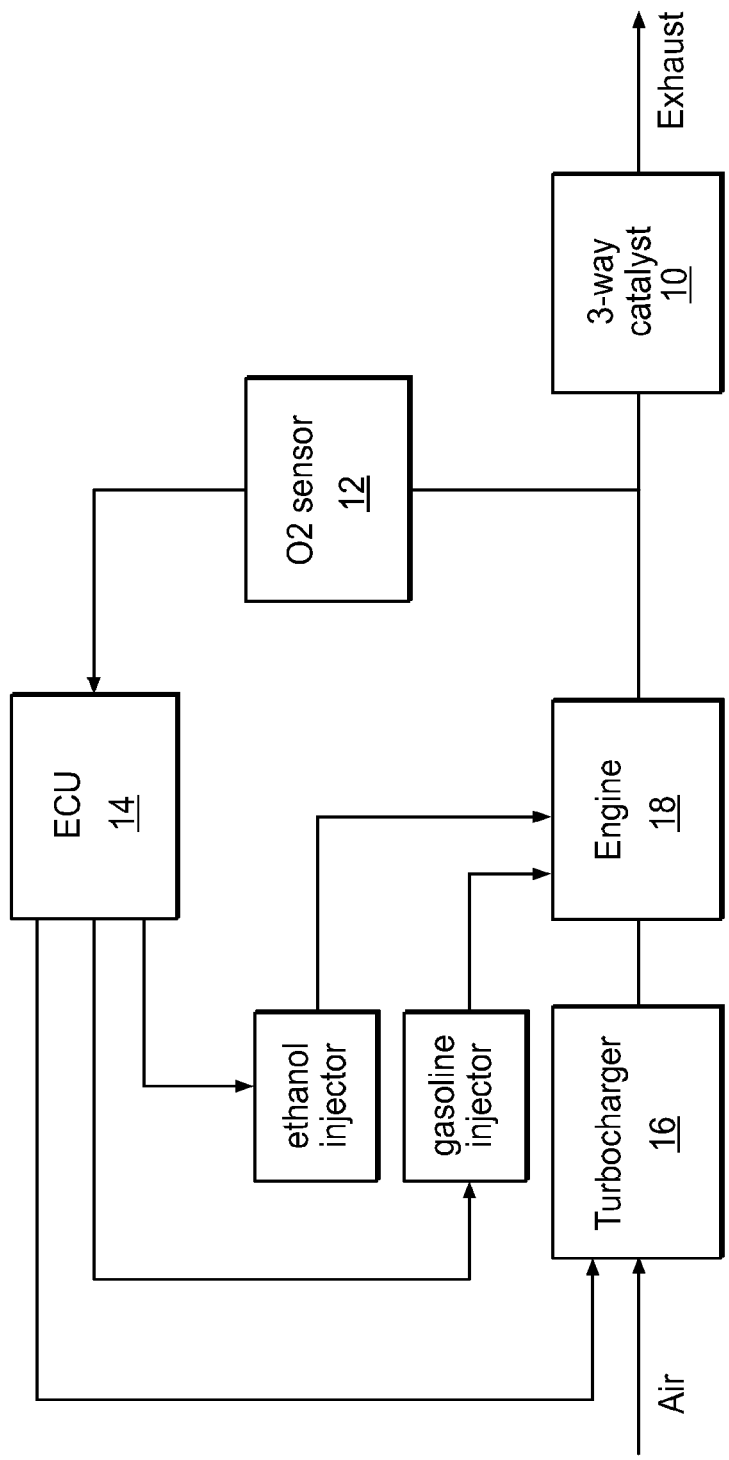
FIG. 3 is a schematic diagram of an embodiment of the fuel management system disclosed herein for maintaining stoichiometric conditions with metering/control of ethanol, gasoline, and air flows into an engine.

In order to minimize emissions, the engine should be operated substantially all of the time, or most of the time, with a stoichiometric air/fuel ratio in order that a 3-way exhaust catalyst treatment can be used. FIG. 3 shows a 3-way exhaust treatment catalyst 10 and air, gasoline and ethanol control needed to maintain the substantially stoichiometric ratio of fuel to air that is needed for its effective operation. The system uses an oxygen sensor 12 as an input to an electronic control unit (ECU) 14. The ECU 14 controls the amount of air into a turbocharger 16, the amount of gasoline and the amount of ethanol so as to insure stoichiometric operation. During transients, open-loop algorithms from a stored engine map (not shown) are used to determine air, gasoline and ethanol flows for keeping substantially stoichiometric combustion in a cylinder of the engine 18.

Thus when variable ethanol octane enhancement is employed, the fuel management system needs to adjust the amounts of air, gasoline and ethanol such that the fuel/air ratio is substantially equal to 1. The additional control is needed because, if the air/gasoline ratio determined by the fuel management were not be corrected during the injection of ethanol, the mixture would no longer be stoichiometric. In contrast to the lean boost approach of Stokes et al. [J. Stokes, T. H. Lake and R. J. Osborne, "A Gasoline Engine Concept for Improved Fuel Economy—The Lean Boost System," SAE paper 2000-01-2902] stoichiometric operation with a 3-way catalyst results in very low tailpipe emissions.

There are certain regions in the engine operating map where the ECU 14 may operate open loop, that is, the control is determined by comparison to an engine map lookup table rather than by feedback from a sensed parameter which in this case is engine knock (closed loop). As mentioned previously, open loop operation during transients may be advantageous.

Another situation where open loop control can be advantageous would be under high load, where fuel rich conditions (where the fuel/air ratio is greater than stoichiometric) may be required to decrease the temperature of the combustion and thus protect the engine and the exhaust system (especially during prolonged operation). The conventional approach in gasoline engine vehicles is to use increased fuel/air ratio, that is, operating at rich conditions. The presence of ethanol on-board allows for two alternatives. The first is the use of ethanol fuel fractions beyond what is required to control knock, thus reducing the combustion temperature by a greater amount than could be obtained by gasoline alone due to the higher cooling effect of evaporation in direct ethanol injection, even while at stoichiometric conditions. The second one is, as in conventional applications, the use of increased fueling in rich operation (which could result in relative air/fuel mass ratios as low as 0.75 where a stoichiometric mixture has a relative air/fuel ratio of 1). The control system can choose between two fuels, ethanol and gasoline. Increased use of ethanol may be better than use of gasoline, with emissions that are less damaging to the environment than gasoline and decreased amount of rich operation to achieve the temperature control needed. Open loop operation with both gasoline and ethanol may require substantial modification of the engine's "lookup table."

Thus, a method of operating an engine is, under conditions of partial load, to operate closed loop with the use of only gasoline. As the engine load increases, the engine control system may change to open loop operation, using a lookup table.

The closed loop control of the engine can be such that a knock sensor (not shown) determines the fraction required of ethanol, while the oxygen sensor 12 determines the total amount of fuel. A variation of this scheme is to operate the knock control open loop, using a lookup table to determine the ethanol to gasoline ratio, but a closed loop to determine the total amount of fuel.

In order to minimize evaporative emission of the ethanol (which has a relatively low boiling point), solvents can be added to the ethanol to minimize the effect. An alternative means is to place an absorptive canister between the ethanol tank and the atmosphere that captures the ethanol and releases it when the engine is operational.

Because of the large cooling effect from ethanol, it has been known for some time that startup of a cold engine is difficult (for example, during the first 30 seconds). With the multiple fuels, it is possible to start up the engine without ethanol addition. Gasoline vaporizes easier than ethanol, and conventional operation with port-fuel or direct injected gasoline would result in easier engine start up. A greater fraction of gasoline than would be ordinarily used can be used to facilitate start-up operation at times during the first 30 seconds of engine operation.

Increased efficiency due to engine downsizing made possible through the use of 100% or close to 100% ethanol at the highest values of torque has the undesirable effect of requiring higher ethanol fractions. Hence the use of non-uniform ethanol distribution to minimize the use of ethanol at these values of torque becomes more attractive when achievement of the maximum efficiency gain is desired.

Below a certain value of torque or boost pressure it can be advantageous to use a non-uniform ethanol distribution in order to reduce the amount of ethanol that is used. Above certain torque or turbocharger or supercharger boost pressures, non-uniform charge would not be used since the engine is operating mostly on ethanol and ethanol non-uniformity cannot be used for minimizing ethanol consumption. This is especially important if the desired fraction is higher than 50%.

The capability to minimize the use of ethanol by non-uniform ethanol distribution in the cylinder can be realized by certain ethanol injection geometries. Ethanol can be injected in the periphery of a swirling charge. In order to minimize wall wetting by the ethanol, it would be convenient to achieve the injection in a manner such that the ethanol injection matches the swirling motion of the charge. The injection direction is thus positioned at an angle with respect to the main axis of the cylinder, injecting the ethanol with an angular direction component. Charge stratification in the case of swirl can be maintained by temperature stratification, with the cooler (and denser) regions in the periphery, which correspond to the end-gas zone.

An alternative or additional method to provide ethanol non-uniform distribution in the cylinder is to inject the ethanol relatively late with respect to bottom dead center. Thus the time for transport and diffusion of the ethanol is minimized. However, sufficient time should be allowed for full vaporization of the ethanol. As the temperatures are higher after Bottom-Dead-Center (BDC), the vaporization time is reduced, and it is less likely that the ethanol would wet the cylinder walls. Improved vaporization of the ethanol can also be achieved by using injectors that produce small droplets. The injector could be a single spray pattern injector with a relatively narrow directed jet. This type of jet would optimize the deposition of the ethanol in the desired region.

Creating a non-uniform ethanol distribution in the cylinder (in the outer regions of the cylinder) has two advantages. The first one is the increased cooling effect of the region that has the propensity to autoignite (knock), the end gas region.

The second is that the central region is not cooled, improving ignition and initial flame propagation. It is preferable to keep the central region hot, as having a fast flame speed early in the flame propagation has antiknock advantages, by reducing the burn time and the time for precombustion chemistry of the end gas. Minimizing the burn time decreases the propensity to knock, as there is no knock if the end gas is burned before it can autoignite. Thus it is possible to have good ignition properties of the air/fuel mixture, even under conditions where the gasoline is evenly spread throughout the cylinder.

Stratified operation can result in locally increased charge cooling. This is because the injected ethanol cools only a small fraction of the charge, and thus, for a given amount of ethanol, the local decrease in temperature is larger with stratified operation than the average decrease of temperature with uniform ethanol distribution. Late injection can aid in the formation of a non-uniform air/ethanol mixture as mixing time is limited. Since a fraction of the gasoline is port-fuel injected, it can be assumed that this fuel is homogeneously distributed in the cylinder, but ethanol is preferentially in the cooler edges (the end-gas). Thus, although overall the air/fuel charge is stoichiometric, locally near the spark it is lean while in the region of the end gas it is rich. Both of these conditions are advantageous, since the ignition occurs in a region with higher temperature (although slightly lean), while the outside is rich and cool, both of which are knock-suppressors.

In the case of swirl or tumble stratified air fuel charges with hot air/gasoline in the center and colder air/ethanol or air/ethanol/gasoline mixtures in the end gas, it is advantageous to place the spark in the region of the hot air/gasoline mixture (substantially near the center of the combustion chamber).

Ethanol consumption can be minimized if the gasoline is also directly injected. In this case, the heat of vaporization of gasoline is also useful in decreasing the temperature of the charge in the cylinder. The gasoline can be injected using a separate set of injectors. This would provide the most flexibility. However, it may be difficult to fit two sets of injectors per cylinder in the limited space in the cylinder head. An alternative means is to provide a single set of injectors for injection of both the ethanol and the gasoline. Two options are possible, one in which there is a single nozzle and valve (and the gasoline and ethanol are co-injected), and one in which each fuel has a separate nozzle and valve.

Using direct injection of both the gasoline and the ethanol has the disadvantage of increased cost. In addition to a sophisticated injector or injectors, a second high pressure fuel pump is also needed. The ethanol and the gasoline also need to have parallel common plenums.

When a single nozzle is used, the ethanol and the gasoline are distributed in the same manner in the cylinder. In the case with a single nozzle and single valve, the fuels need to be mixed prior to the valve/nozzle part of the injector. This could be done either outside of the injector or in the injector body. The volume between the mixing point and the nozzle should be minimized to allow for fast response of the fuel mixture.

A slight modification of the above embodiment involves an injector that has two valves but a single nozzle. This minimizes the need for a second valve outside the injector for controlling the gasoline/ethanol mixture, in addition to minimizing the volume between the mixing point and the valves.

It is possible to use a separate nozzle/valve for each fuel in a single injector. In this case, the gasoline and the ethanol can be deposited in different regions of the cylinder. An additional advantage would be to provide different spray patterns for the ethanol and for the gasoline. This would provide the most flexible system (comparable to two independent injectors), with possibilities of simultaneous or asynchronous injection of varying fractions of ethanol/gasoline, as well as being able to deposit the ethanol and the gasoline in the desired location of the charge, for optimal non-uniform distribution of ethanol in the cylinder. Optimal distribution means knock avoidance with minimal consumption of ethanol, while maintaining engine drivability. Optimal non-uniform ethanol distribution can be obtained by centrally depositing the gasoline and by preferentially depositing the ethanol in the periphery of the cylinder, where the end gas will be. This can be accomplished more easily with direct injection as opposed to achieving non-uniform distribution of the gasoline through non-uniform spraying in the inlet manifold. Because the heat of vaporization of the gasoline is substantially lower than for ethanol (a factor of 4 smaller on an energy basis), the cooling effect in the region near the spark is smaller, affecting less the initial flame propagation. In addition, it may be beneficial to retard the injection of the ethanol with respect to the gasoline.

When the ethanol has been exhausted, the engine can operate in a 'lower performance gasoline only' mode with turbocharger boost decrease (e.g. by a wastegate) and elimination or avoidance of operation at maximum torque levels. These conditions could be limiting, and in some cases a means of operating the vehicle at higher loads would be desired. This could be accomplished by using gasoline in the ethanol system with gasoline direct injection (GDI), while at the same time port-fuel injecting a fraction of the gasoline. Under these conditions the engine will operate at higher loads and higher torques, but still far below what ethanol could achieve. Only the cooling effect of the direct injection fuel is obtained, since the directly injected fuel has the same octane number as the port-injection fuel (gasoline in both cases).

If the ratio of ethanol in the ethanol fuel tank to gasoline in the gasoline fuel tank is lower than a predetermined value (because of the lack or availability of ethanol or for some other reason), it is possible to change the engine operation condition such that the ethanol/gasoline consumption ratio over a drive cycle is decreased. This is done for reducing the maximum ethanol fraction at a given engine speed that can be used in the engine. The allowed level of turbocharging and the maximum pressure, torque and horsepower would be correspondingly reduced to prevent knock. In this way, a continuous tradeoff between the ethanol/gasoline consumption ratio and the maximum torque and horsepower can be accomplished.

By proper expert system evaluation of the recent ethanol/gasoline usage and amounts of gasoline and ethanol it is possible to provide means to minimize the need of the 'low performance, gasoline only' mode. The usage of the antiknock agent can be restricted when the amount left in the tank is below a predetermined level, such that the main fuel will be exhausted prior to or simultaneously with the ethanol. It would be desirable to place a switch so that the operator could override the limitations, in those conditions where the desired vehicle operation will not be limited by the exhaustion of the antiknock agent.

Over a drive cycle, the amount of ethanol (by energy) required to enhance the octane number sufficiently to increase efficiency by at least 25% would be less than 15% of the fuel (ethanol+gasoline energy) without ethanol stratification and less than 5% with ethanol stratification.

Onboard separation of ethanol from diesel by fractional distillation has been demonstrated for use in ethanol exhaust aftertreatment catalysts ["Fuel-Borne Reductants for NOx Aftertreatment: Preliminary EtOH SCR Study", John Thomas, Mike Kass, Sam Lewis, John Storey, Ron Graves, Bruce Bunting, Alexander Panov, Paul Park, presented at the 2003 DEER (Diesel Engine Emissions Reduction) Workshop, Newport R.I. August 2003]. This approach could be employed for onboard separation of ethanol from a gasoline mixture. However, use of membrane separation can be simpler and less expensive. Although there is information about the use of membranes for the separation of ethanol from water, to our knowledge there is no available information on the membrane separation of ethanol from gasoline. Because the ethanol molecule is on the order of 4 Angstroms and the typical hydrocarbon fuel molecules are much larger, it is possible to use membranes for the separation. Both organic and inorganic membranes could be used. Since it is not necessary to obtain high purity ethanol, the process is relatively simple and requires low pressure.

Both porous and transfusion membranes can be used because ethanol with two carbon atoms has significantly different properties than most other gasoline compounds which have five to ten carbon atoms. The other antiknock agents contemplated for use in this invention also have a small number of carbons relative to gasoline. For example, methanol has one carbon. The membrane approach can be significantly simpler than the distillation or absorption/ desorption approaches (see Ilyama et al, U.S. Pat. No. 6,332,448) that have been suggested for separation of various gasoline/diesel fuels where there is much less of a difference in the number of carbon atoms.

The location of the membrane could be in the region of high pressure in the fuel line (downstream from the pump), or upstream from it. If it is located downstream, the separation occurs only when the engine is operational and the pump is on, while if it is upstream the separation is continuous. The pressure of the fuel downstream from the pump is a few bars (characteristic of port fuel injection). This is to be differentiated from the pressure of the ethanol system, which is directly injected and thus requires much higher pressures.

The separated ethanol is transported to a separate tank where it is stored. If there is too much ethanol, three options are available: 1) additional separation is stopped; 2) some ethanol is used in the engine, even if not required 3) ethanol is returned to the main gasoline tank.

The tank should be reachable, in order to be able to introduce additional ethanol when required, as when towing, in high temperatures, or when doing extensive climbing, conditions that require operation at high torque and which if for extended periods of time would consume ethanol at a rate higher than what can be extracted from the fuel.

Extraction of ethanol from the gasoline can have the unintended effect of reducing the octane of the rest of the fuel. Thus, it is likely that somewhat increased use of injected ethanol would be required to prevent knock. Even in the case without non-uniform distribution of the ethanol, under normal driving conditions the system can be designed so that the amount of ethanol extracted from the fuel matches the required ethanol.

It may also b e advantageous to separate the ethanol from a gasoline/ethanol mixture at the fueling station. As with onboard separation, this approach also allows use of the present fuel transportation infrastructure. The potential advantages could be greater flexibility in choice of a fuel separation system and lower cost relative to onboard separation. It may be of particular interest during the introductory phase of ethanol boosted engine vehicles.

It can be useful to have the capability to adjust the volume of the ethanol tank, thus varying the maximum amount of ethanol in the ethanol tank. This capability would make it possible to drive longer distances between ethanol refueling and to operate on different gasoline/ethanol ratios over a drive cycle, depending on the availability and cost of ethanol and gasoline. In some cases, it may be advantageous to use more ethanol than is needed to provide the desired octane enhancement (e.g., to meet alternative fuel or $CO_2$ reduction goals). It is desirable to have this capability without increasing the overall fuel tank size. A single fuel tank with a membrane or plate separating variable amounts of gasoline and ethanol can be used to accomplish this goal.

Figure 4A:
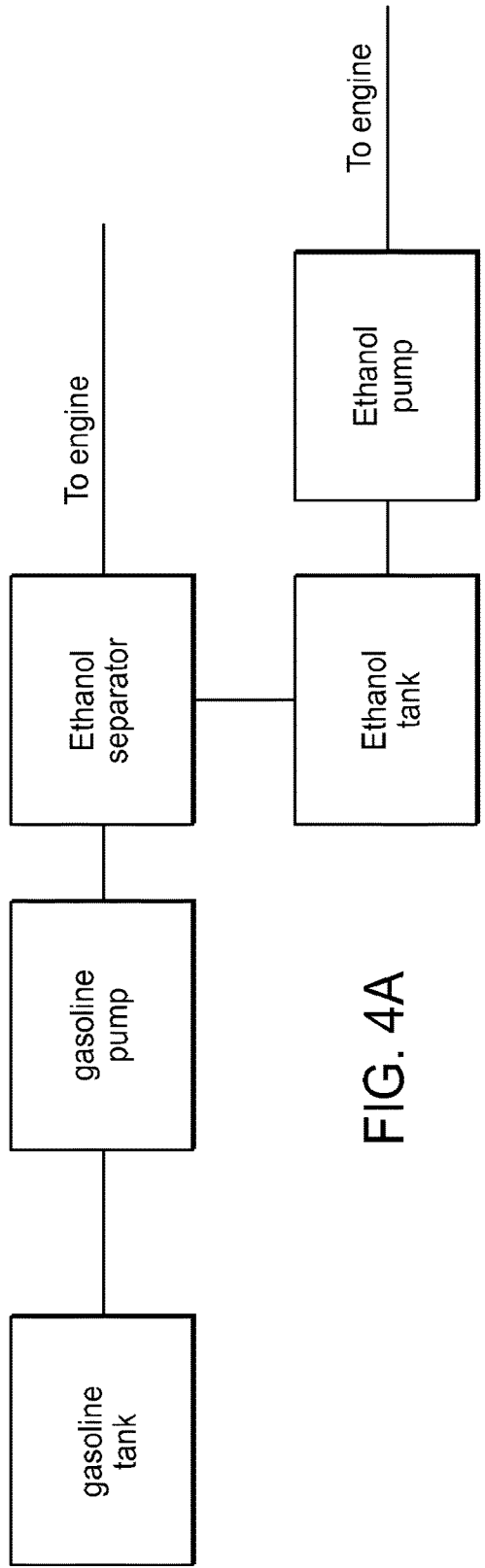
FIGS. 4a and 4b are schematic illustrations relating to the separation of ethanol from ethanol/gasoline blends.
Figure 4B:
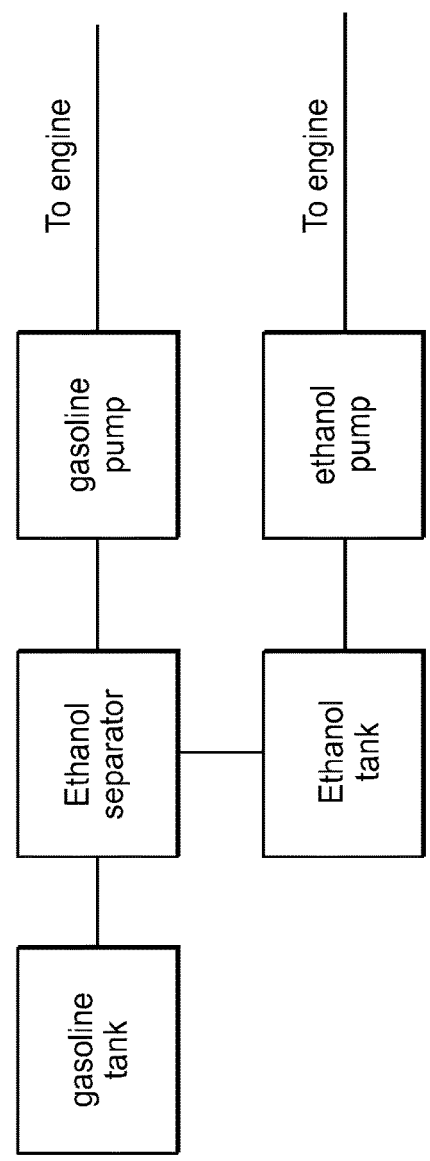

The tank can be configured to have a horizontal or vertical moveable/deformable walls that are substantially impervious and separate the regions that are filled with gasoline and ethanol. Separate filling ports and fuel lines are incorporated for each region as shown in FIGS. 4a and b. The separation between the gasoline and ethanol (or other anti-knock agent) does not have to be perfect since a small amount of leakage of one fuel into the other will not adversely affect operation of the vehicle. The wall can be moved in response to the amount of either fuel in the tank. This process is automatic in the case of a separating membrane, and the latter can be more impervious to leaks from one fuel to the other.

Figure 5:
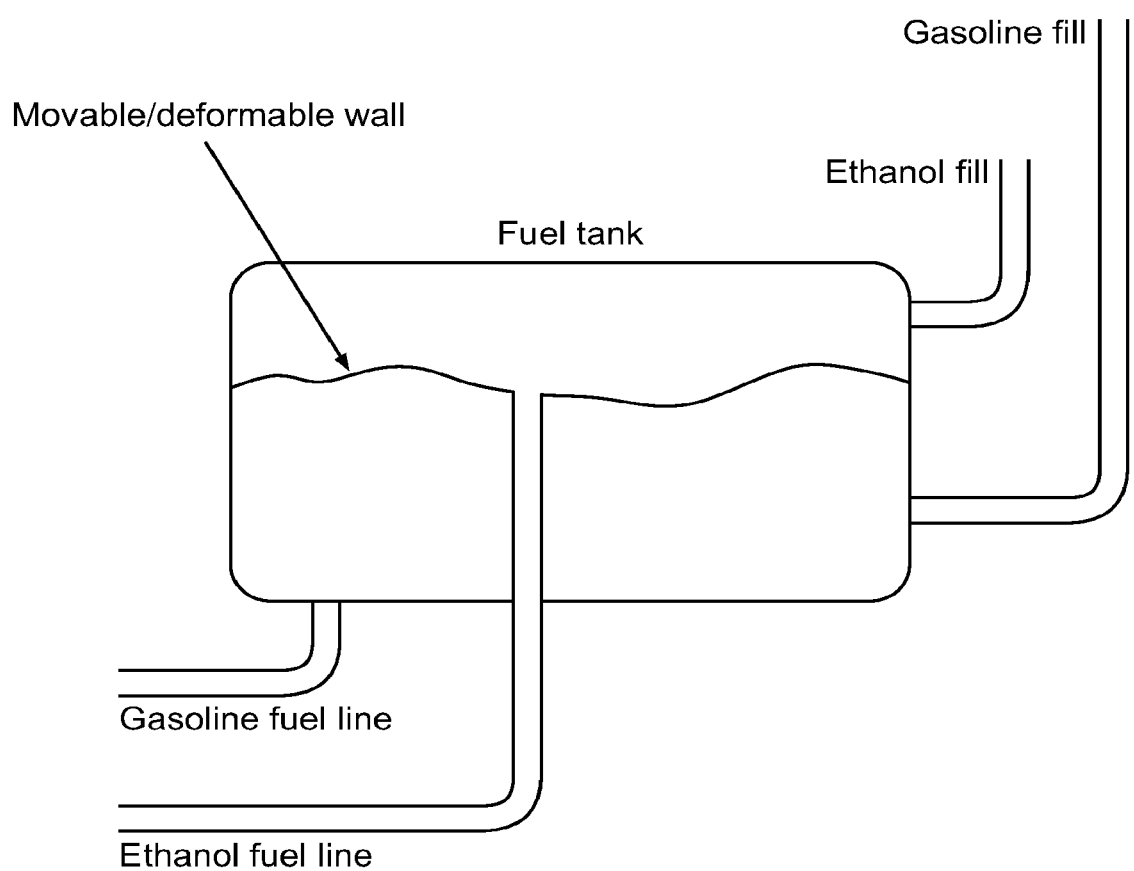
FIG. 5 is a cross-sectional view of a flexible fuel tank for a vehicle using ethanol boosting of a gasoline engine.

Ethanol is denser than gasoline. The movable/deformable wall can be placed such that the ethanol is located either on top of the gasoline or below the gasoline. However, since it is expected that less ethanol is required than gasoline, the preferred embodiment has the ethanol above the gasoline, as shown in FIG. 5.

If the ethanol is stored so that it is separate from the gasoline, it can be mixed with various additives to insure the desired operation of the ethanol injection system. In addition, it is possible to use gasoline-ethanol mixtures, such as E85 (which contains 15% by volume of gasoline). The lubricity additives include fatty acids, organic amine salts (amine salts of acid phosphates and polyethyleneoxy acid phosphates), alkyl and aryl acid phosphates and dialkyl alkyl phosphonates.

The modeling calculations show that for direct injection of alcohols, the larger impact of knock suppression is not the intrinsic knock-resistance of the fuel antiknock agent but rather its high heat of vaporization. In order to evaluate alternatives to ethanol, Table 3 shows the properties of proposed fuel antiknock/alternative fuels. Although some of these additives have higher octane numbers than gasoline, some of them have a much larger effect on the cylinder charge temperature (Table 3 assumes injection after the inlet valve has closed). Some of these additives (mostly the ethers) have a comparable charge temperature effect to that of gasoline direct injection, and thus are of less interest. The alcohols have optimal properties for the application, with temperature changes that are a factor of 3 or larger than the temperature change due to gasoline direct injection (for 100% or near 100% operation with the additive). For ethanol, the change in temperature is a factor of more than 4 larger than that of gasoline, and for methanol the change is about 9 times larger. The temperature decrease of the air increases with the amount of oxygen in the fuel (in terms of the O/C ratio). Thus, it is highest for methanol, with an O/C ratio of 1, second for ethanol (O/C=2), and so on.

TABLE 3

Antiknock properties of various fuels (calculated from data obtained in SAE standard J 1297 Alternative Automotive Fuels, September 2002)

| Fuel Type | Chemical formula | RON | MON | (R + M)/2 | Net heat of Combustion MJ/kg | Latent heat of vaporization MJ/kg | Vaporization energy/heat of combustion | Stoic air/fuel ratio | Equiv. Latent heat of vaporization MJ/kg air | $\Delta T_{air}$ K |
|---|---|---|---|---|---|---|---|---|---|---|
| Gasoline | | | | | 42.8 | 0.30 | 0.007 | 14.6 | 0.020 | −28 |
| Ethyl t-Buytl Ether | CH3CH2—O—C(CH3)3 | 118 | 102 | 110 | 36.3 | 0.31 | 0.009 | 12.1 | 0.026 | −35 |
| t-Amyl Methyl Ether | C2H5 C (CH3)2—O—CH3 | 111 | 98 | 105 | 36.3 | 0.32 | 0.009 | 12.1 | 0.027 | −36 |
| Toluene | C7H8 | 111 | 95 | 103 | 40.5 | 0.36 | 0.009 | 13.5 | 0.027 | −37 |
| Methyl t-Butil Ether | CH3—O—C(CH3)3 | 116 | 103 | 110 | 35.2 | 0.32 | 0.009 | 11.7 | 0.028 | −37 |
| Diisopropyl Ether | (CH3)2CH—O—CH(CH3)2 | 110 | 97 | 103 | 38.2 | 0.34 | 0.009 | 12.1 | 0.028 | −39 |
| t-Butly Alchohol | (CH3)3 C—OH | 103 | 91 | 97 | 32.9 | 0.60 | 0.018 | 11.1 | 0.054 | −74 |
| Isopropanol | (CH3)2CHOH | 118 | 98 | 108 | 30.4 | 0.74 | 0.024 | 10.4 | 0.071 | −97 |
| Methanol with cosolvent | 50% methanol/TBA | 114 | 96 | 105 | 26.5 | 0.88 | 0.033 | 8.8 | 0.100 | −137 |
| Ethanol | CH3CH2OH | 129 | 102 | 115 | 26.7 | 0.91 | 0.034 | 9 | 0.102 | −138 |
| Methanol | CH3OH | 133 | 105 | 119 | 20.0 | 1.16 | 0.058 | 6.4 | 0.181 | −246 |

Also shown in Table 3 are the ratios of the heat of vaporization to the heat of combustion, a measure of the potential effects when used as antiknock agents. This parameter gives a measure of the amount of evaporative cooling for a given level of torque. The last entry, $\Delta T_{air}$, measures the decrease in air temperature for a stoichiometric mixture with injection after the inlet valve closes. Although the effect clearly is maximized by the use of methanol, other considerations may make ethanol the preferred choice. Methanol is toxic and corrosive.

Hydrous ethanol (with a small amount of water) has the advantage of lower cost than pure (neat) ethanol. Removing the last 10% to 15% water from ethanol has significant expense and consumes considerable energy. Manufacturing facilities typically produce ethanol with about 10% water by volume unless there is a need for essentially pure (anhydrous) ethanol. It could be advantageous to use ethanol with a water concentration of 5% to 15% by volume.

By using a closed loop approach to identify engine knock, flexible gasoline grades (with different octane ratings) and flexible knock-prevention fuel grades can be used. An open loop system would require measurement of the quality of the antiknock additive. Similarly, an open loop system would require determining the quality of the fuel (octane number). Closed loop operation allows the use of less expensive gasoline, when available, thus partially compensating for the more expensive anti-knock agent. It is also possible to use different antiknock fuel according to its availability, such as ethanol in the regions that produce and process corn, and methanol in those that have methanol production capabilities. Thus, the least expensive grade of gasoline available and the least expensive antiknock fuel can be used, allowing a decrease of the cost of operating the vehicle as well as increasing the availability of the antiknock fuel.

Although the above discussion has featured ethanol as an exemplary anti-knock agent, the same approach can be applied to other high octane fuel and fuel additives with high vaporization energies such as methanol (with higher vaporization energy per unit fuel), and other anti-knock agents such as isopropanol, tertiary butyl alcohol, or ethers such as methyl tertiary butyl ether (MTBE), ethyl tertiary butyl ether (ETBE), or tertiary amyl methyl ether (TAME). It may be advantageous to use various mixtures of these fuels and additives with each other and with ethanol.

Particularly during the introduction phase of the present invention, the ethanol fueling could be performed by the use of containers, such as one-gallon containers. To facilitate ease of fueling an expandable pipe and funnel can be built into the ethanol fuel tank of the vehicle.

The ethanol in these containers would be denatured so as to prevent human consumption as an alcoholic beverage and could contain the additives described above. Ethanol sold for fuel, such as in Brazil, is denatured by a small fraction of gasoline (2%) among other denaturing agents (methanol, isopropanol and others).

Recycling of the container could take place at certain specific locations such as gasoline stations Using a signal from a knock sensor to determine when and how much ethanol or other anti-knock agent must be used at various times in a drive cycle to prevent knock, the fuel management system can be employed to minimize the amount of ethanol or other anti-knock agent that is consumed over the drive cycle. If sufficient ethanol or other anti-knock agent is available, the fuel management system can also be used to employ more ethanol than would be needed to prevent knock. This would allow greater gasoline savings (the gasoline savings component from substitution of ethanol for gasoline would increase) and carbon dioxide reduction. In this case it may be desirable to operate at an anti-knock agent fraction which is either varied or constant during the drive cycle.

The contents of all of the references cited in this specification are incorporated by reference herein in their entirety.

It is recognized that modifications and variations of the inventions disclosed herein will be apparent to those of ordinary skill in the art and all such modifications and variations are included within the scope of the appended claims.

What is claimed is:

1. A fuel management system for a spark ignition engine, comprising:
   a first fueling system that uses direct injection;
   a second fueling system that uses port fuel injection; and
   a three-way catalyst configured to reduce emissions from the spark ignition engine, wherein the fuel management system is configured to provide fueling in a first torque range, the first torque range being a first range of torque values at which both the first fueling system and the second fueling system are operable throughout the first range of torque values, wherein the fuel management system is further configured such that a fraction of fueling provided by the first fueling system is higher at a highest value of torque in the first torque range than in a lowest value of torque in the first torque range, wherein the fuel management system is further configured to provide fueling in a second torque range, the second torque range being a second range of torque values at which the second fueling system is operable throughout the second range of torque values and the first fueling system is not operable throughout the second range of torque values, wherein the fuel management system is further configured such that when the system provides fueling at a torque value that exceeds the second range of torque values, the spark ignition engine is operated in the first torque range, and wherein the spark ignition engine is configured to operate at a stoichiometric air/fuel ratio in at least part of the first torque range and in at least part of the second torque range.

2. The fuel management system of claim 1, wherein the first fueling system is configured to prevent knock when torque increases.

3. The fuel management system of claim 1, where the spark ignition engine is configured to be operated at a stoichiometric air/fuel ratio throughout the second torque range.

4. The fuel management system of claim 1, where the spark ignition engine is configured to be operated at a stoichiometric air/fuel ratio throughout the first torque range.

5. The fuel management system of claim 1, wherein the second torque range extends from a zero value of torque to a highest value of torque in the second torque range.

6. The fuel management system of claim 1, wherein a highest value of torque in the second torque range is a highest value of torque at which the spark ignition engine is operable without fueling from the first fueling system being provided to prevent knock.

7. The fuel management system of claim 1, wherein the fuel management system is further configured to increase the fraction of fueling provided by the first fueling system in the first torque range to prevent knock in at least part of the first torque range that begins at a lowest value of torque in the first torque range.

8. The fuel management system of claim 7, wherein the fuel management system is further configured to increase the fraction of fueling provided by the first fueling system in the first torque range as torque increases so as to minimize the amount of fueling provided by the first fueling system that is used while still preventing knock.

9. The fuel management system of claim 7, wherein as torque increases the fraction of fueling provided by the first fueling system is increased to be substantially equal to an amount of fueling sufficient to prevent knock.

10. The fuel management system of claim 1, wherein the fuel management system is further configured to use a knock detector for closed loop control, and wherein a signal from the knock detector is configured to determine at least one of when to provide fueling or how much fueling to provide from the first fueling system to prevent knock at various times during a drive cycle of the spark ignition engine.

11. The fuel management system of claim 1, wherein the fuel management system is further configured to reduce the fraction of fuel that is provided by the first fueling system as torque decreases while still preventing knock.

12. The fuel management system of claim 1, wherein the first fueling system is configured to introduce gasoline into the engine and the second fueling system is configured to introduce gasoline into the engine.

13. A fuel management system for a spark ignition engine, comprising:
a first fueling system that uses direct injection;
a second fueling system that uses port fuel injection; and
a three-way catalyst configured to reduce emissions from the spark ignition engine,
wherein the fuel management system is configured to provide fueling in a first torque range, the first torque range being a first range of torque values at which both the first fueling system and the second fueling system are operable throughout the first range of torque values,
wherein the fuel management system is further configured such that a fraction of fueling provided by the first fueling system is higher at a highest value of torque in the first torque range than in a lowest value of torque in the first torque range,
wherein the fuel management system is further configured to provide fueling in a second torque range, the second torque range being a second range of torque values at which the second fueling system is operable throughout the second range of torque values and the first fueling system is not operable throughout the second range of torque values,
wherein the fuel management system is further configured such that when the fueling system provides fueling at a torque value that exceeds the second range of torque values, the spark ignition engine is operated in the first torque range,
wherein the fuel management system is further configured to use spark retard to reduce the fraction of fueling provided by first fueling system, and
wherein the spark ignition engine is configured to operate at a stoichiometric air/fuel ratio in at least part of the first torque range and in at least part of the second torque range.

14. The fuel management system of claim 13, wherein the first fueling system is configured to introduce gasoline into the engine and the second fueling system is configured to introduce gasoline into the engine.

15. The fuel management system of claim 13, wherein the fuel management system is further configured to control spark retard to reduce the fraction of fueling provided by the first fueling system by using information from a knock sensor and a sensed parameter.

16. The fuel management system of claim 13, wherein the fuel management system is further configured to use spark retard to change the fraction of fueling provided by the first fueling system to zero.

17. The fuel management system of claim 13, wherein the fuel management system is further configured to use a knock detector for closed loop control, and wherein a signal from the knock detector is configured to determine at least one of when to provide fueling or how much fueling to provide from the first fueling system to prevent knock at various times during a drive cycle of the spark ignition engine.

18. The fuel management system of claim 17, wherein the fraction of fueling provided by the first fueling system in at least part of the first torque range is substantially equal to a fraction sufficient to prevent knock as torque increases.

19. The fuel management system of claim 13, wherein a highest value of torque in the first torque range is a highest value of torque at which the spark ignition engine is operable in a drive cycle without fueling being provided entirely by the first fueling system to prevent knock.

20. The fuel management system of claim 13, wherein at a value of torque higher than a highest torque value in the first torque range, the fuel management system is configured to provide fueling entirely by the first fueling system.

21. The fuel management system of claim 13, wherein the fuel management system is configured to introduce gasoline into the engine by the first fueling system and by the second fueling system.

22. The fuel management system of claim 13,
wherein the fuel management system is configured to control the fraction of fuel introduced by the first fueling system using a sensor that detects knock to determine at least one of when to provide fueling or how much fueling to provide from the first fueling system.

23. A fuel management system for a spark ignition engine comprising:
a first fueling system configured to directly inject fuel into at least one cylinder of the spark ignition engine;
a second fueling system that uses port fuel injection; and
a three-way catalyst configured to reduce emissions from the spark ignition engine,
wherein the fuel management system is configured to provide fueling in a first torque range, the first torque range being a first range of torque values at which both the first fueling system and the second fueling system are operable throughout the first range of torque values,
wherein the fuel management system is further configured to provide knock resistance such that a fraction of fuel introduced by first fueling system increases with increasing manifold pressure to prevent knock,
wherein the fuel management system is further configured to provide fueling in a second torque range, the second torque range being a second range of torque values at which the second fueling system is operable throughout the second range of torque values and the first fueling system is not operable throughout the second range of torque values,
wherein the fuel management system is configured such that when the system provides fueling at a torque value that exceeds the second range of torque values, the spark ignition engine is operated in the first torque range,
wherein the fraction of fueling provided by the first fueling system in the first torque range increases with increasing torque values to prevent knock in at least part of the first torque range that begins at a lowest value of torque in the first torque range,
wherein the first fueling system is configured to prevent knock as torque increases,
wherein the fuel management system is configured to control the fuel introduced by the first fueling system using a signal from a knock sensor to determine when to provide fueling and how much fueling to provide at various times during a drive cycle of the spark ignition engine to prevent knock, and
wherein the spark ignition engine is configured to operate at a stoichiometric air/fuel in at least part of the first torque range and in at least part of the second torque range.

24. The fuel management system of claim 23, wherein as torque increases the fraction of fueling provided by the first fueling system is increased to be substantially equal to an amount of fueling sufficient to prevent knock.

25. The fuel management system of claim 23, wherein the fuel management system is further configured to increase the fraction of fueling provided by the first fueling system in the first torque range as torque increases so as to limit an amount of fueling provided by the first fueling system that is used to prevent knock.

26. The fuel management system of claim 23, wherein the fuel management system is further configured to inject fuel from the first fueling system after an inlet valve of the engine is closed.

27. The fuel management system of claim 23, wherein the fuel management system is further configured to inject fuel from the first fueling system after an inlet valve of the engine is closed, the fuel being injected into hot gas and wall wetting being reduced.

28. The fuel management system of claim 23, wherein the fuel management system is further configured such that both the first and second fueling systems are used at the highest torque value at which the engine is operated in a drive cycle.

29. The fuel management system of claim 23, wherein the fuel management system is further configured to use spark retard to reduce an amount of fuel that is provided by the first fueling system.

30. The fuel management system of claim 23, where the fuel management system is further configured to use spark retard to change the fraction of fueling provided by the first fueling system to zero.

31. The fuel management system of claim 23, wherein the first fueling system is configured to introduce gasoline into the engine and the second fueling system is configured to introduce gasoline into the engine.

* * * * *